US010298832B2

(12) United States Patent
Boudreau et al.

(10) Patent No.: US 10,298,832 B2
(45) Date of Patent: *May 21, 2019

(54) VEHICLE CAMERA SYSTEM

(71) Applicant: Cobra Electronics Corporation, Chicago, IL (US)

(72) Inventors: Wilfred Charles Boudreau, Mundelein, IL (US); Michael E. Williams, Forest Park, IL (US); Brian Neal Hosler, Elmhurst, IL (US); Jonathan Charles Levell, Evanston, IL (US)

(73) Assignee: Cobra Electronics Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,232

(22) Filed: Nov. 21, 2018

(65) Prior Publication Data

US 2019/0098200 A1     Mar. 28, 2019

Related U.S. Application Data

(63) Continuation of application No. 15/809,850, filed on Nov. 10, 2017, now Pat. No. 10,142,535, which is a
(Continued)

(51) Int. Cl.
*H04W 24/00* (2009.01)
*H04N 5/232* (2006.01)
(Continued)

(52) U.S. Cl.
CPC ........... *H04N 5/23206* (2013.01); *B60R 1/00* (2013.01); *G01S 7/003* (2013.01); *G01S 7/022* (2013.01);
(Continued)

(58) Field of Classification Search
CPC ........ H04N 5/2306; H04N 7/185; H04N 7/18; H04N 5/232; H04N 5/765; H04N 5/77;
(Continued)

(56) References Cited

U.S. PATENT DOCUMENTS 3,956,626 A    5/1976 Ross
4,360,811 A    11/1982 Cantwell et al.
(Continued)

FOREIGN PATENT DOCUMENTS

CN    201718054 U    1/2011
GB       2371432 A    7/2002
(Continued)

OTHER PUBLICATIONS

Blog Entry "Radar detector interface to iPhone," by Bearnerboy on Tuesday, Aug. 25, 2009, www.trapster.com, printed on Nov. 5, 2009.
(Continued)

*Primary Examiner* — Mahendra Patel
(74) *Attorney, Agent, or Firm* — Hitchcock Evert LLP

(57) ABSTRACT

A vehicle camera system and method for operating a vehicle camera system comprising a vehicle camera with communication capabilities. The vehicle camera operating in conjunction with other components to provide information to users. The vehicle camera system compiles information from multiple components into a single repository of video recordings with information, such as location information, vehicle status and diagnostic information, alert information and other information.

33 Claims, 12 Drawing Sheets

Related U.S. Application Data continuation of application No. 14/853,818, filed on Sep. 14, 2015, now Pat. No. 9,848,114, which is a continuation-in-part of application No. 13/840,496, filed on Mar. 15, 2013, now Pat. No. 9,132,773, which is a continuation-in-part of application No. 13/518,167, filed as application No. PCT/US2010/060952 on Dec. 17, 2010, now Pat. No. 8,970,422, and a continuation-in-part of application No. 13/514,232, filed as application No. PCT/US2010/059115 on Dec. 6, 2010, now Pat. No. 8,842,004.

(60) Provisional application No. 61/289,278, filed on Dec. 22, 2009, provisional application No. 61/267,172, filed on Dec. 7, 2009.

(51) Int. Cl.

| | | |
|---|---|---|
| *G01S 7/02* | (2006.01) | |
| *G01S 7/00* | (2006.01) | |
| *B60R 1/00* | (2006.01) | |
| *H04M 1/725* | (2006.01) | |
| *H04N 7/18* | (2006.01) | |

(52) U.S. Cl.
CPC .......... *H04M 1/7253* (2013.01); *H04N 7/185* (2013.01); *H05K 999/99* (2013.01); *B60R 2300/302* (2013.01); *B60R 2300/60* (2013.01); *B60R 2300/80* (2013.01)

(58) Field of Classification Search
CPC ...... H04N 5/775; H04N 5/781; H04N 9/7921; H04N 9/8042; H04N 9/8063; B60R 7/003; B60R 2300/302; B60R 2300/60; B60R 2300/80; G01S 7/022; G01S 7/003; G07C 5/008; G07C 5/0866; H04K 999/99; H04M 1/7253; G08G 1/0967
USPC .............. 455/456.1, 404.2, 422.1, 434, 90.1; 348/207.1, 143; 701/411, 330, 117, 119, 701/301, 32.3
See application file for complete search history.

(56) References Cited

U.S. PATENT DOCUMENTS

| | | | |
|---|---|---|---|
| 5,021,961 A | 6/1991 | Ross et al. | |
| 5,151,701 A | 9/1992 | Valentine et al. | |
| 5,206,651 A | 4/1993 | Valentine et al. | |
| 5,218,467 A | 6/1993 | Ross et al. | |
| 5,229,947 A | 7/1993 | Ross et al. | |
| 5,250,951 A | 10/1993 | Valentine et al. | |
| D366,659 S | 1/1996 | Ross et al. | |
| 5,510,793 A | 4/1996 | Gregg, III et al. | |
| 5,515,042 A | 5/1996 | Nelson | |
| 5,515,402 A | 5/1996 | Chester | |
| 5,598,338 A | 1/1997 | Taniguchi et al. | |
| 5,617,085 A | 4/1997 | Tsutsumi et al. | |
| 5,742,340 A | 4/1998 | Alves | |
| 5,784,021 A | 7/1998 | Oliva | |
| 5,815,092 A | 9/1998 | Gregg, III et al. | |
| 5,859,628 A | 1/1999 | Ross et al. | |
| 5,912,822 A | 6/1999 | Davis et al. | |
| 5,935,190 A | 8/1999 | Davis et al. | |
| 5,938,717 A | 8/1999 | Dunne et al. | |
| 5,943,653 A | 8/1999 | Ross et al. | |
| 5,948,038 A | 9/1999 | Daly et al. | |
| 5,977,884 A | 11/1999 | Ross | |
| 6,118,403 A | 9/2000 | Lang | |
| 6,201,493 B1 | 3/2001 | Silverman | |
| 6,204,798 B1* | 3/2001 | Fleming, III ........... G01S 7/022 |
| | | | 342/195 |
| 6,265,989 B1 | 7/2001 | Taylor | |
| 6,266,617 B1* | 7/2001 | Evans .................... G08G 1/205 |
| | | | 340/436 |
| 6,384,776 B1 | 5/2002 | Martin | |
| 6,400,304 B1 | 6/2002 | Chubbs, III | |
| 6,442,485 B2 | 8/2002 | Evans | |
| 6,449,540 B1 | 9/2002 | Rayner | |
| 6,469,653 B1* | 10/2002 | Haynes .................. G01S 7/022 |
| | | | 340/904 |
| 6,480,144 B1 | 11/2002 | Miller et al. | |
| 6,483,452 B1 | 11/2002 | Iwakini | |
| 6,498,569 B2 | 12/2002 | Dijkstra | |
| 6,567,035 B1 | 5/2003 | Elliott | |
| 6,670,905 B1 | 12/2003 | Orr | |
| 6,675,085 B2 | 1/2004 | Straub | |
| 6,718,239 B2 | 4/2004 | Rayner | |
| 6,748,322 B1 | 6/2004 | Fernandez | |
| 6,750,785 B2 | 6/2004 | Trajkovic et al. | |
| 6,845,317 B2* | 1/2005 | Craine ................... B60K 37/02 |
| | | | 340/438 |
| 6,895,324 B2 | 5/2005 | Straub | |
| 6,943,723 B2* | 9/2005 | Kim ........................ G01S 7/022 |
| | | | 342/13 |
| 6,980,092 B2 | 12/2005 | Turnbull et al. | |
| RE39,038 E | 3/2006 | Fleming, III | |
| 7,042,345 B2* | 5/2006 | Ellis ...................... A61H 3/061 |
| | | | 340/436 |
| 7,058,356 B2 | 6/2006 | Slotznick | |
| 7,171,187 B2 | 1/2007 | Haave et al. | |
| 7,183,942 B2 | 2/2007 | Rock et al. | |
| 7,301,494 B2 | 11/2007 | Waters | |
| 7,468,659 B2 | 12/2008 | Haave et al. | |
| 7,471,236 B1 | 12/2008 | Pitt et al. | |
| 7,489,993 B2 | 2/2009 | Coffee et al. | |
| RE40,653 E | 3/2009 | Fleming, III | |
| 7,525,568 B2* | 4/2009 | Raghunath ............ H04N 5/782 |
| | | | 340/539.21 |
| 7,702,044 B2 | 4/2010 | Nallapureddy et al. | |
| 7,764,219 B2 | 7/2010 | Pitt et al. | |
| 7,804,440 B1 | 9/2010 | Orr | |
| RE41,905 E | 11/2010 | Fleming, III | |
| 7,899,450 B2 | 3/2011 | Pitt et al. | |
| 7,965,222 B2 | 6/2011 | Pitt et al. | |
| 7,999,721 B2 | 8/2011 | Orr | |
| 8,099,466 B2 | 1/2012 | Tenereillo | |
| 8,185,132 B1 | 5/2012 | Katpelly et al. | |
| 8,255,155 B1 | 8/2012 | Crane et al. | |
| 8,373,588 B2 | 2/2013 | Kuhn | |
| 8,421,667 B2 | 4/2013 | Batten et al. | |
| 8,442,524 B2 | 5/2013 | Jendbro et al. | |
| 8,466,806 B2 | 6/2013 | Schofield | |
| 8,515,414 B2 | 8/2013 | Pitt et al. | |
| 8,525,723 B2 | 9/2013 | Orr et al. | |
| 8,792,041 B2 | 7/2014 | Green et al. | |
| 8,842,004 B2 | 9/2014 | Kabler et al. | |
| 8,890,954 B2 | 11/2014 | O'Donnell et al. | |
| 8,896,694 B2 | 11/2014 | O'Donnell et al. | |
| 8,970,422 B2 | 3/2015 | Washlow et al. | |
| 9,132,773 B2 | 9/2015 | Washlow et al. | |
| 9,135,818 B2 | 9/2015 | Washlow et al. | |
| 9,279,881 B2 | 3/2016 | Orr et al. | |
| 9,648,114 B2 | 12/2017 | Boudreau et al. | |
| 2001/0030624 A1 | 10/2001 | Schwoegler | |
| 2002/0135504 A1 | 9/2002 | Singer | |
| 2002/0152264 A1 | 10/2002 | Yamasaki | |
| 2003/0052797 A1* | 3/2003 | Rock .................. G01C 21/3697 |
| | | | 340/936 |
| 2003/0080878 A1* | 5/2003 | Kirmuss ................. B60R 11/02 |
| | | | 340/936 |
| 2003/0137426 A1* | 7/2003 | Anthony ............... B60R 25/102 |
| | | | 340/574 |
| 2003/0139150 A1 | 7/2003 | Rodriguez et al. | |
| 2003/0214430 A1 | 11/2003 | Husted et al. | |
| 2003/0218562 A1* | 11/2003 | Orr ......................... G01S 7/022 |
| | | | 342/20 |
| 2004/0056778 A1* | 3/2004 | Hilliard ................. G08G 1/042 |
| | | | 340/933 |
| 2004/0107037 A1 | 6/2004 | Straub | |

(56) References Cited

U.S. PATENT DOCUMENTS

| | | | |
|---|---|---|---|
| 2004/0233036 A1* | 11/2004 | Sefton | G07B 15/04 340/5.53 |
| 2004/0254729 A1* | 12/2004 | Browne | B60R 21/013 701/301 |
| 2004/0257208 A1* | 12/2004 | Huang | B60R 25/102 340/426.1 |
| 2005/0242984 A1* | 11/2005 | Waters | G01S 7/022 342/52 |
| 2006/0078047 A1* | 4/2006 | Shu | G08B 13/19608 375/240.01 |
| 2006/0089792 A1* | 4/2006 | Manber | G01C 21/3644 701/408 |
| 2006/0132349 A1* | 6/2006 | Stern | G01S 7/022 342/20 |
| 2006/0136236 A1* | 6/2006 | Horton | G06Q 10/08 705/330 |
| 2006/0167784 A1 | 7/2006 | Hoffberg | |
| 2006/0271593 A1* | 11/2006 | De Mes | G06F 16/58 |
| 2007/0035632 A1* | 2/2007 | Silvernail | G07C 5/085 348/211.3 |
| 2007/0046531 A1 | 3/2007 | Yu | |
| 2007/0069921 A1* | 3/2007 | Sefton | G08G 1/0175 340/932.2 |
| 2007/0109187 A1 | 5/2007 | Murphy | |
| 2007/0216521 A1 | 9/2007 | Guensler et al. | |
| 2007/0219720 A1 | 9/2007 | Trepagnier et al. | |
| 2007/0222639 A1 | 9/2007 | Giles et al. | |
| 2008/0147401 A1 | 6/2008 | Odinak et al. | |
| 2008/0211914 A1* | 9/2008 | Herrera | H04N 7/18 348/148 |
| 2008/0255754 A1* | 10/2008 | Pinto | G01C 21/3691 701/119 |
| 2008/0269993 A1* | 10/2008 | Simpson | B60R 21/0132 701/45 |
| 2009/0016418 A1 | 1/2009 | Silver et al. | |
| 2009/0092284 A1* | 4/2009 | Breed | B60J 10/00 382/103 |
| 2009/0160696 A1 | 6/2009 | Pare et al. | |
| 2009/0210114 A1* | 8/2009 | Baumann | B60R 21/0132 701/45 |
| 2010/0157061 A1* | 6/2010 | Katsman | G07C 5/008 348/149 |
| 2010/0183265 A1 | 7/2010 | Hill et al. | |
| 2010/0214148 A1 | 8/2010 | Kuhn | |
| 2010/0214149 A1 | 8/2010 | Kuhn | |
| 2010/0242906 A1 | 9/2010 | Konezny | |
| 2010/0250369 A1 | 9/2010 | Peterson et al. | |
| 2010/0269143 A1* | 10/2010 | Rabowsky | H04B 7/18591 725/63 |
| 2010/0317420 A1 | 12/2010 | Hoffberg | |
| 2011/0025851 A1 | 2/2011 | Rumble | |
| 2011/0149933 A1 | 6/2011 | Pitt et al. | |
| 2012/0136559 A1 | 5/2012 | Rothschild | |
| 2012/0229657 A1* | 9/2012 | Calman | G06Q 50/01 348/207.1 |
| 2012/0236173 A1 | 9/2012 | Telek et al. | |
| 2012/0268306 A1 | 10/2012 | Coburn et al. | |
| 2012/0311559 A1 | 12/2012 | Clark et al. | |
| 2012/0326889 A1 | 12/2012 | Kabler et al. | |
| 2013/0009760 A1 | 1/2013 | Washlow et al. | |
| 2013/0063554 A1 | 3/2013 | Green et al. | |
| 2013/0091548 A1 | 4/2013 | Song | |
| 2013/0194381 A1 | 8/2013 | McMahon et al. | |
| 2013/0207829 A1 | 8/2013 | Kabler et al. | |
| 2013/0211707 A1 | 8/2013 | Washlow et al. | |
| 2013/0214939 A1 | 8/2013 | Washlow et al. | |
| 2013/0238168 A1 | 9/2013 | Reyes | |
| 2014/0020033 A1 | 1/2014 | Wilson et al. | |
| 2014/0368601 A1 | 12/2014 | deCharms | |
| 2014/0375800 A1 | 12/2014 | Lim et al. | |
| 2015/0009347 A1 | 1/2015 | O'Donnell et al. | |
| 2015/0036047 A1 | 2/2015 | Bledsoe | |
| 2015/0123834 A1 | 5/2015 | Kabler et al. | |
| 2015/0224929 A1 | 8/2015 | McCarthy et al. | |
| 2015/0237252 A1 | 8/2015 | O'Donnell et al. | |
| 2016/0187461 A1 | 6/2016 | Orr et al. | |
| 2018/0084184 A1 | 3/2018 | Boudreau et al. | |

FOREIGN PATENT DOCUMENTS

| | | | | |
|---|---|---|---|---|
| GB | 2456782 A | 7/2009 | | |
| JP | 2003132488 A | 5/2003 | | |
| JP | 2006058191 A | 3/2006 | | |
| JP | 2006269178 A | 11/2008 | | |
| JP | 2009097865 A | 5/2009 | | |
| JP | 2009277059 A | 11/2009 | | |
| WO | WO-9733262 A1 * | 9/1997 | | G03B 7/093 |
| WO | 200029869 A1 | 5/2000 | | |
| WO | WO-0029869 A1 * | 5/2000 | | G01S 7/022 |
| WO | 200155744 A2 | 8/2001 | | |
| WO | 2004107580 A3 | 12/2004 | | |
| WO | 2008137996 A1 | 11/2008 | | |
| WO | 2010096760 A1 | 8/2010 | | |
| WO | 2011071826 A1 | 6/2011 | | |
| WO | 2011087714 A1 | 7/2011 | | |
| WO | 2014151793 A2 | 9/2014 | | |
| WO | 2017048581 A1 | 3/2017 | | |

OTHER PUBLICATIONS

Radar Active Website, May 15, 2010, www.radaractive.com, as saved by Web.archive,org, printed on Jan. 21, 2013.

"Ford Prototype Car Talks to Other Cars," Jan. 26, 2011, www.ceoutlook.com, as printed on Feb. 3, 2011.

"Ford's intelligent vehicles communicate wirelessly, shoot hula hoops out of tailpipes (video)," Jan. 27, 2011, www.engadget.com, as printed on Jan. 21, 2013.

Mumble Webpage, http://muble.sourceforge.net, printed on Oct. 15, 2013.

Entry for "Multimedia Messaging Service" in Wikipedia at Wikipedia.org, retrieved on May 9, 2014.

Understand—Google Street View webpage, http://www.google.com/maps/streetview/understand/, printed on Dec. 7, 2015.

Garmin Dash Cam 35 webpage, https://buy.garmin.com/en-US/US/on-the-road/533/garmin-dash-cam-35/prod517726.html, printed on Dec. 7, 2015.

GoPro—HERO4 Black 4K Ultra HD Waterproof Camera webpage, https://shop.gopro.com/hero4/hero4-black/CHDHX-401 .html, printed on Dec. 7, 2015.

F750—THINKWARE Dash Cam webpage, http://www.thinkware.com/Products/Dashcam/F750, printed on Dec. 7, 2015.

* cited by examiner

VEHICLE CAMERA SYSTEM

CROSS-REFERENCE TO RELATED APPLICATION

The current application is a continuation of U.S. application Ser. No. 15/809,850, entitled "Vehicle Camera System" and filed on Nov. 10, 2017. U.S. application Ser. No. 15/809,850 is a continuation of U.S. application Ser. No. 14/853,818, entitled "Vehicle Camera System" and filed on Sep. 14, 2015. The current application is also related to International Application No. PCT/US16/50796, which claims priority to U.S. application Ser. No. 14/853,818. U.S. application Ser. No. 14/853,818 is a continuation-in-part of U.S. application Ser. No. 13/840,496, entitled "Mobile Communication System and Method for Analyzing Alerts Associated with Vehicular Travel" and filed on Mar. 15, 2013. U.S. application Ser. No. 13/840,496 claims priority to U.S. application Ser. No. 13/518,167, entitled "Radar Detector That Interfaces with a Mobile Communication Device" and filed on Aug. 9, 2012, which claims the benefit of priority from U.S. Provisional Application No. 61/289,278, entitled "Radar Detector That Interfaces with a Mobile Communication Device" and filed on Dec. 22, 2009. U.S. application Ser. No. 13/840,496 also claims priority to U.S. application Ser. No. 13/514,232, entitled "Analyzing Data from Networked Radar Detectors" and filed on Aug. 9, 2012, which claims the benefit of priority from U.S. Provisional Application No. 61/267,172, entitled "Analyzing Data from Networked Radar Detectors" and filed on Dec. 7, 2009. The preceding applications are incorporated herein by reference.

FIELD OF THE DISCLOSURE

This disclosure relates generally to the field of vehicle camera equipment and systems. The disclosure further relates to systems interfacing with a vehicle camera apparatus with mobile communication devices and other devices. The disclosure also relates to the exchange, coordination, communication and use of information among the vehicle camera and mobile communication device system.

BACKGROUND

Cameras have been incorporated in various locations within vehicles. For example, cameras may be incorporated in a vehicle design to aid in driving (e.g., backup cameras). For another example, cameras may be mounted in a vehicle to record areas around the vehicle (e.g., dash cams). Videos may be saved in the limited memory in the dash camera until downloaded from the dash cameras to a connected computer or another video is saved over the earlier video recording. Dash cameras may record video and in some embodiments display the recorded video or the currently recording video feed. Some dash cameras may record audio with the video feed.

Vehicle systems exist which interface an electromagnetic signal detector with a mobile communication device to improve alert and warning systems. These systems also connect the radar detector and/or mobile phone to remote servers to improve prediction analysis for the potential alert. For example, U.S. Pat. No. 8,970,422 titled "Radar Detector that Interfaces with a Mobile Communication Device" and U.S. Pat. No. 8,842,004 titled "Analyzing Data from Networked Radar Detectors" teach such vehicle systems. U.S. Patent Application Publication No. 2013/0214939 titled "Mobile Communication System and Method for Analyzing Alerts Associated with Vehicular Travel" also discloses such a vehicle system which is also operable to facilitate recorded and broadcast communication using the mobile communication device. The disclosures of U.S. Pat. Nos. 8,970,422 and 8,842,004 and U.S. Patent Application Publication No. 2013/0214939 are incorporated herein by reference.

SUMMARY

The present disclosure teaches a vehicle camera that interfaces with another device to provide a vehicle camera system. The vehicle camera system coordinates various capabilities of each component to improve the experience and information available within the vehicle and to a larger community.

Embodiments of the present disclosure provide a vehicle camera system including a vehicle camera wirelessly communicating with a mobile communication device to exchange data. In some embodiments, the data is provided from the mobile communication device to the vehicle camera. In other embodiments, the data is provided from the camera to the mobile communication device. Some embodiments exchange data between the vehicle camera and the mobile communication device.

Embodiments of the present disclosure allow components to be designed for specific purposes without incorporating redundant components within the system. For example, the vehicle camera may receive position data from a mobile phone containing a GPS component instead of incorporating a redundant GPS component in the vehicle camera. Accordingly, embodiments of the vehicle camera without the redundant components may facilitate smaller sizes and lower manufacturing costs.

Embodiments of the disclosure may also include additional data sources and/or destinations. For example, an electromagnetic signal detector within the vehicle may send an alert to the vehicle camera. This communication may be directly sent to the vehicle camera and/or indirectly sent to the vehicle camera through a mobile communication device.

Vehicle camera system embodiments may also exchange data with remote components, such as a server. Communication between the vehicle camera and the server may occur indirectly using the separate and independent communication capabilities of the mobile communication device. In some embodiments, the server may provide alert predictions, video overlays, camera control instructions and/or other information to the vehicle camera system which may control the vehicle camera operations. In some embodiments, the server may facilitate indirect communication between vehicle camera system components. For example, a radar detector with cellular communication capability may send signal detection data to a server operating as part of the cloud and the vehicle camera may receive the signal detection data from the cloud through a wide-area Wi-Fi communication component.

Video collection and retention features of some embodiments of the vehicle camera may be modified based upon data and/or instructions received from other components in the vehicle camera system. In addition, saved videos may be wirelessly transmitted to separate components in the vehicle camera system to maintain a maximum storage space within the vehicle camera. Moving the video storage off the vehicle camera may also facilitate the use of smaller memory elements within the vehicle camera.

In some embodiments, the vehicle camera may embed additional information in video recordings and/or correlate additional data with a video recording into a single file for transmission and/or playback. The additional information and/or data may be provided from other components in the vehicle camera system. In some embodiments, the video is transmitted to other devices for post-processing of a video recording to embed additional data.

In some embodiments, the video recording may be electronically analyzed. The additional analysis may occur within another component of the vehicle camera system. For example, the video may be transmitted to a server for further analysis. In some embodiments, the server may use video recognition software to identify elements recorded within the video feed. The analysis may be correlated with additional data. For example, additional data may indicate that an electromagnetic signal was detected during the video recording and the analysis may determine a likely source of the electromagnetic signal. In some embodiments, the server may determine a prediction of an alert based upon the video analysis.

In some embodiments, the vehicle camera system may use one or more events identified by another component to automatically trigger certain operations within the vehicle camera. In some embodiments, certain events may operate to override a user's default control setting. For example, a user may set the vehicle camera microphone to an off default setting; however, an emergency event trigger causes the vehicle camera to turn the microphone on to record audio during the event.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
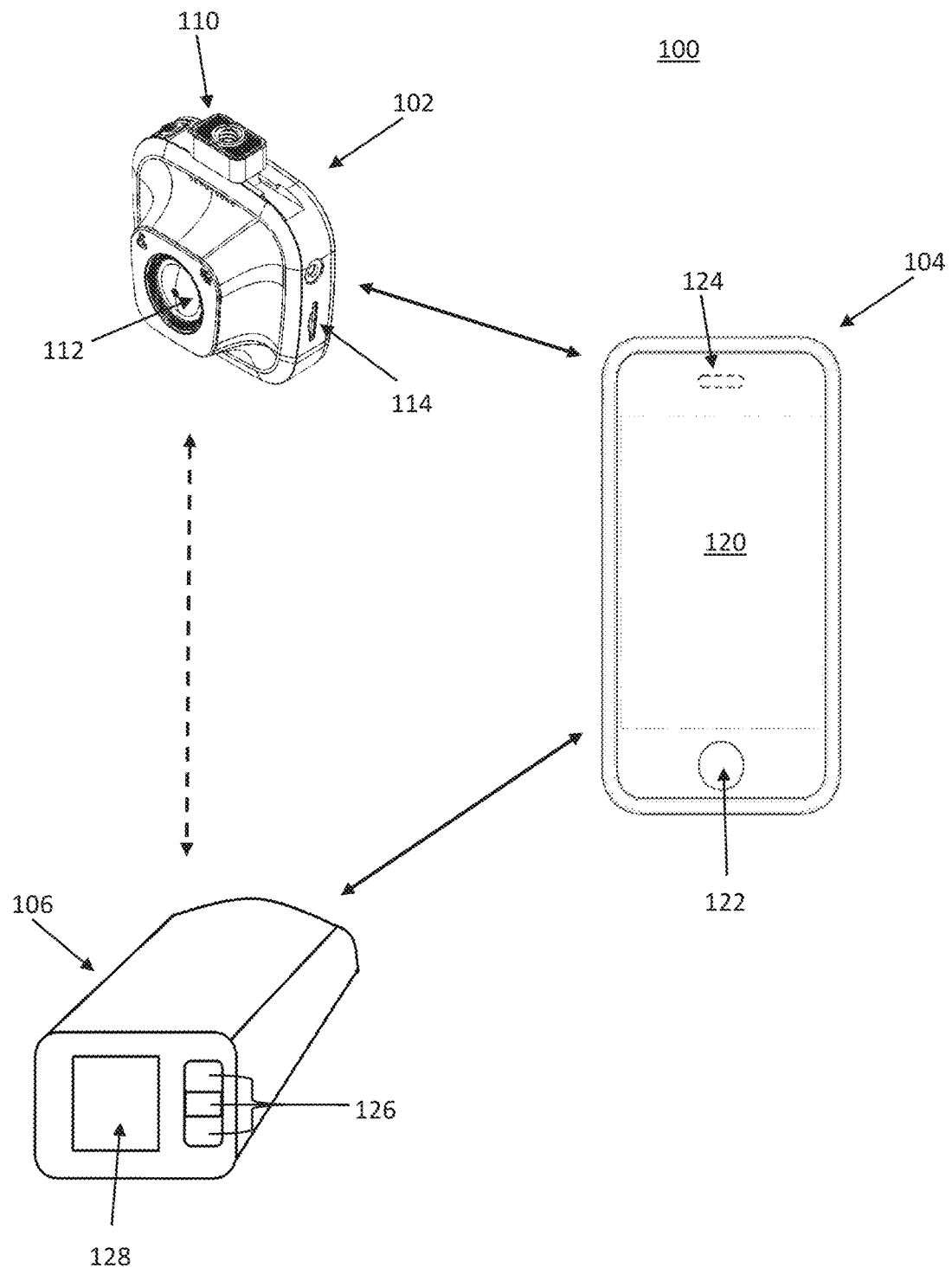
FIG. 1 is an embodiment of a vehicle camera system of the present disclosure.

FIG. 1 depicts vehicle camera system 100 comprising interactive components which may be located within and/or attached to a vehicle, such as a car, truck, motorcycle, ATV, boat, bicycle and/or other vehicle. In this embodiment, the vehicle camera system 100 includes a vehicle camera 102, a mobile communication device 104 and an electromagnetic signal detector 106. The vehicle camera 102 is shown as a dash camera in this embodiment. The vehicle camera 102 may include any camera designed for use in and/or mounted to a vehicle. For example, the vehicle camera 102 may be a dash camera, a camera mounted in the vehicle body (e.g. a backup camera), a camera attached to the rear window or another camera mounted in the vehicle to view one or more people in the vehicle. As one skilled in the art will recognize, the vehicle camera system 100 may include any number of the vehicle cameras 102, mobile communication devices 104 and electromagnetic signal detectors 106 and should not be limited to the illustrative example provided in FIG. 1.

The vehicle camera 102 shown may be attached to a mount within the vehicle using connection 110. For example, a mount may be adhered to the front windshield of a vehicle and attached to connection 110 to hang the vehicle camera 102 from the dash of a vehicle. In some embodiments, the connection 110 may be designed to connect to a mount for the rearview mirror in a vehicle. Although the connection 110 shows a threaded female connection in this embodiment, one skilled in the art will recognize that the connection 110 may be any type of connection to hold the camera to a mounting component. Alternatively, the connection 110 may comprise the mounting component and directly connect to the vehicle. For example, the connection 110 may comprise a suction cup array designed to hold the vehicle camera 102 adjacent to the windshield. In some embodiments, the vehicle camera 102 may be integrated into a rearview mirror and/or other device, such as a navigation unit, a dashboard decoration or other device.

In some embodiments, the mounting component may incorporate a movement element to rotate and/or tilt the vehicle camera 102 such that the focal point of the vehicle camera 102 may be changed. In some embodiments, the movement element may allow a user to manually adjust focal point of the vehicle camera 102. In some embodiments, the movement element may be electromechanical wherein user controls and separate computer instructions drive the movement element to change the focal point of the vehicle camera 102.

The vehicle camera 102 may also include zoom features to modify the image in some embodiments. The zoom features may include a digital zoom feature and/or a mechanical zoom feature. In some embodiments, the zoom feature may be used to adjust the view of vehicle camera 102 such that the recorded image does not include the dash and/or hood of the vehicle. For example, the vehicle camera 102 may zoom in on the horizon to a sufficient point that the dash and/or hood of the vehicle is not in the image. In some embodiments, the vehicle camera 102 may incorporate additional and/or alternative features to adjust the view of vehicle camera 102 such that recorded image does not include the dash and/or hood of the vehicle. For example, the vehicle camera 102 may include a feature to adjust the viewing frame within the user setting options. The user interface of the vehicle camera 102 and/or another component in the vehicle camera system 100 may show the default view of vehicle camera 102 and adjustable frame lines defining the operable frame of the images recorded by the vehicle camera 102. The user may adjust the frame lines to eliminate unwanted items from the images, such as the vehicle dash and hood, an upper edge of the windshield and/or other items.

In some embodiments, a component within the vehicle camera system 100 and/or a remotely connected component may remove unwanted items during post-processing of the recording. For example, the mobile communication device 104 may apply frame adjustments to a video recording that is saved based on a user input selection, a video lock trigger and/or another selection or trigger event. For another example, the vehicle camera 102 may use optical recognition to identify portions of the video that appear stationary, such as the vehicle dash and hood, and remove the stationary items from the recording.

The operation of the vehicle camera 102 to record video is consistent with a conventional camera operation. The video camera 102 receives an image on a lens 112 and converts the image on the lens 112 into a recording. The video is recorded on a memory component in the vehicle camera 102. The elements of the vehicle camera 102 used to capture the image as a still picture and/or a video are referred to herein as the imaging component of the vehicle camera 102.

In some embodiments, the vehicle camera 102 may include a removable memory component, such as a memory card 114. The vehicle camera 102 may include internal memory components and removable memory components. Use of each memory component may be prioritized in the vehicle camera 102. For example, the vehicle camera 102 may loop the recordings on internal memory and save locked recordings to the removable memory component. The priority may be established through user settings in some embodiments. In some embodiments, the vehicle camera 102 may save the recordings to both memory components during operation. In some embodiments, the recordings are referred to as image files.

Embodiments of the vehicle camera 102 may operate in a loop to store multiple limited duration video clips, such as video clips that are 1 minute long, into memory of the vehicle camera 102 and once the designated memory space is full, the vehicle camera 102 overwrites the existing video clips stored in the memory unless they have been locked or otherwise prioritized to prevent or delay overwriting the specific video clip. For example, a user may lock a video clip to prevent overwriting the video clip. For another example, the vehicle camera 102 may place an intermediate priority flag to save a video clip associated with an alert received by the vehicle camera 102. In some embodiments, the system 100 and/or a remote device may manage the video clip or image file including the video clip based upon the priority flag.

In some embodiments, the vehicle camera 102 will automatically lock one or more video clips based upon a critical trigger, such as a G-Force threshold, a decibel threshold, a vehicle diagnostic trigger, a safety trigger and/or another trigger. For example, a critical trigger may occur when the vehicle camera system 100 detects a change in the decibel level is above a threshold decibel change. In some embodiments, the delta or change in decibel level may be measured based upon a looping comparison of decibel levels with the preceding decibel level to determine whether a sudden change occurred which may indicate a critical event, such as a collision, an emergency alarm or siren, a gunshot, engine failure and/or other event. In some embodiments, the baseline decibel level may be based upon a speaker output, such as the radio output in the vehicle, and the threshold decibel level to indicate a critical event is based upon a delta over the baseline decibel level. In such embodiments, the vehicle camera system 100 may communicate with components with speakers to identify the current volume settings and receive user volume changes in real-time to prevent false critical identifications based upon user volume changes.

In some embodiments, the vehicle camera 102 includes a microphone and/or other audio recording elements. The vehicle camera 102 may include controls to allow the user to mute or turn off the microphone. For example, the user may press a button to mute the microphone to keep confidential and/or private audio within the vehicle from being recorded. For another example, an instruction from the mobile communication device 104 may cause internal controls of the vehicle camera 102 to mute the microphone. In some embodiments, the vehicle camera 102 may operate to effectuate the muting instruction of the microphone during post processing of a video in order to ensure audio is available if an emergency, critical or important event occurs, such as a collision, a crime, a weather event, a nature event, an arrest or other applicable event. For example, the vehicle camera 102 may record an audio/visual file and remove the audio portion from the file unless a triggering event or user input identifies the file as critical.

In some embodiments, the vehicle camera 102 operates in a loop to store a video recording and a corresponding, separate audio recording for a set duration. After the recording loop repeats, the vehicle camera 102 deletes the audio recording unless the vehicle camera 102 is in a critical operation mode wherein the files are identified as critical and locked. The vehicle camera 102 enters the critical operation mode when a critical identification or trigger occurs. The critical identification may be based upon a manual input by a user and/or based upon a trigger event, such as a G-Force threshold, a peak decibel threshold, a decibel change threshold, a vehicle diagnostic trigger, a safety trigger and/or another trigger. For example, the vehicle camera system 100 may identify a recording as critical based upon a safety trigger, such as an impact trigger, an airbag deployment trigger, a lane departure, a distance to object trigger and/or another safety trigger. Once identified as critical, the vehicle camera 102 or another component associated with the vehicle camera 102 may merge the corresponding video and audio recordings into a single audio/visual file.

Embodiments of the vehicle camera 102 may operate to store audio files corresponding to each video file in the storage of vehicle camera 102 and overwrite the audio file in conjunction with the video file. In such an embodiment, the audio file will be deleted unless the user or a system trigger operates to lock or save the audio file. The audio file in such embodiments may be contained within hidden storage so that the audio file is not readily apparent for playback and may require sufficient user credentials to be played. When a user locks a video file in such an embodiment, the vehicle camera 102 may provide the option of saving the video file, the audio file and/or a merged audio/visual file. In other embodiments, the vehicle camera 102 may record both a video only file and an audio/visual file. The vehicle camera 102 may delete the audio/visual file unless the recording is identified as critical through a user interface or automatically based upon a triggering event. During operation, if an audio/visual file is saved, the video only file will be overwritten as part of a looping operation of the vehicle camera 102. In such an embodiment, a post-processing merge of files is unnecessary and a partial audio/visual file may be available in the event the camera becomes damaged during a collision or other incident. In some embodiments, the combined audio/visual file may be hidden or encrypted to prevent unauthorized access to the file. The audio management features improve the computer system processing operation for managing a muting operation selected by a user while providing audio availability in the event of a critical event.

In some embodiments, the vehicle camera 102 also includes a communication element operable to communicate over a short-range or near-field communication standard, such as the BLUETOOTH® communication standard, the ZIGBEE® communication standard, the Wi-Fi communication standard, or any other communication standard. For example, the vehicle camera 102 may include a low-energy BLUETOOTH communication component. Although specific communication standards may be identified for illustrative examples herein, one skilled in the art will recognize that other communication standards may be employed and remain within the scope and spirit of the invention. In some embodiments, communication elements that operate on wide area networks may be incorporated into the vehicle camera 102. While some embodiments may incorporate communication elements for wide area networks, embodiments with only short-range communication components may reduce complexity, size and cost of the vehicle camera 102 design and operation compared to integrating wide-area network communication elements.

In the vehicle system 100 shown, the vehicle camera 102 communicates with the mobile communication device 104 using the short-range communication standard. In addition, the vehicle camera 102 may optionally communicate directly with the electromagnetic signal detector 106 using the short-range communication standard.

The mobile communication device 104 may be a mobile phone, a cellular phone, a smart phone, a satellite phone, a personal digital assistant, a portable computer, a laptop computer, a tablet computer, and/or any other device with a user interface and the capability to wirelessly communicate. In this embodiment, the mobile communication device 104 includes a screen 120, a button 122 and a speaker 124. In some embodiments, the mobile communication device 104 may include additional components, such as additional user interface components (e.g. buttons, controls, microphones, displays, audio and light outputs, etc.), cameras and/or input/output ports. The mobile communication device 104 may exchange data with the vehicle camera 102 using the short-range communication standard. For example, the mobile communication device 104 may transmit alert information, the current speed, the current location, current heading, weather information (such as temperature and barometric pressure), lighting information, traffic information, roadway information and other information available to the mobile communication device 104. In some embodiments, the mobile communication device 104 may receive local data such as weather data, fuel prices and driving conditions associated with the current geographic location from a server and transmit the local data to the vehicle camera 102. The local data may be retrieved in some embodiments based upon information available to the vehicle camera system 100 or triggered by a subscription service. For example, the mobile communication device 104 may receive vehicle operation data indicating low fuel and retrieve local data relating to fuel prices near the current geographic location. Once the fuel prices are retrieved, the mobile communication device 104 may transmit the low gas warning with select nearby fuel prices to the vehicle camera 102 for the user.

Other user input components such as switches, slide controls and other control components may be used instead of button 122. The display 120 provides a visual output on the face of the mobile communication device 104. In some embodiments, the display 120 may also provide a touch screen option to operate as an additional input component. The speaker 124 is designed to provide an audible output for the mobile communication device 104. In some embodiments, additional and/or alternative input and output components may be included in the mobile communication device 104.

Embodiments of the mobile communication device 104 include one or more communication elements. The communication element(s) facilitate both short-range communication and wide area communication capabilities. For example, the mobile communication device 104 may include one communication element which facilitates communication over a short-range communication standard, such as those discussed above, and a second communication element which facilitates communication over a wide area communication standard. The wide area communication standard may include communication networks such as a cellular telephone network, a satellite network, a Wi-Fi, another wireless network, and/or the Internet. As one skilled in the art will recognize, the vehicle camera system 100 through the mobile communication device 104 may operate on one or more public networks, private networks or combinations of public and private networks.

The mobile communication device 104 may exchange information with the vehicle camera 102 using the short-range or near-field communication capabilities embedded in each component. This exchange of information or data between the mobile communication device 104 and the vehicle camera 102 facilitates many operational capabilities for the vehicle camera system 100 discussed further herein. For example, the mobile communication device 104 may enable the vehicle camera 102 to utilize the corresponding user interface of the mobile communication device 104 for input and output operations for the vehicle camera 102. In addition, the user interface of the vehicle camera 102 may be used to provide input and output operations for the mobile communication device 104. For example, the user interface of the vehicle camera 102 may be used to operate music controls facilitated by the mobile communication device 104. In addition, the transfer of information may improve the efficiency and/or operations of one or more of the hardware components of the vehicle camera system 100. The vehicle camera system 100 may also facilitate additional advantages by leveraging the pre-existing communication capabilities of the mobile communication device 104. For example, the vehicle camera 102 may leverage the pre-existing communication capabilities of the mobile communication device 104 to inexpensively, quickly, and easily exchange data with a remote data source, such as a server and/or another vehicle camera system 100 located in another vehicle. In addition, the vehicle camera 102 may receive information from the remote data source via the pre-existing communication capabilities of the mobile communication device 104.

In addition to the operational advantages, the vehicle camera system 100 may provide cost benefits. Many potential vehicle camera 102 users already own and regularly use a mobile communication device 104, such as a mobile phone, and therefore may not need to purchase any additional mobile communication device 104 to interface with the vehicle camera 102. Because the user likely owns a mobile communication device 104, embodiments of the vehicle camera 102 may be designed without redundant elements (e.g. cellular network cards, GPS chips, etc.) to reduce cost without forgoing capabilities provided by these elements.

In this embodiment, the vehicle camera system 100 also includes an electromagnetic signal detector 106. In some embodiments, the vehicle camera system 100 may not include the electromagnetic signal detector 106. An electromagnetic signal detector is a device designed to detect electromagnetic signals (such as microwave signals) or laser signals transmitted from radar or laser-type speed measurement equipment, such as police radar signals. Thus, electromagnetic signal detectors serve to provide advance warning to drivers who are being monitored by police radar. As used herein, the terms radar detector and electromagnetic signal detector will be used interchangeably to refer to any of a number of known signal detection units capable of detecting electromagnetic signals in the X-band, K-band or Ka-band. Furthermore, the terms radar detector and electromagnetic signal detector will also be used interchangeably to refer to radar and/or laser detectors, and could refer to any electromagnetic wave detector or light wave detector designed to detect signals generated by another device. The terms radar detector and electromagnetic signal detector do not refer to imaging devices, such as cameras, that are not designed to detect generated signals. Examples of known technology in this area include U.S. Pat. Nos. 5,784,021 and 5,151,701.

The electromagnetic signal detector 106 shown includes controls 126 and display 128. The controls 126 are depicted as three buttons in this embodiment. In some embodiments, the controls 126 may comprise other user input components such as switches, slide controls and other control components. In some embodiments, the display 128 may provide a touch screen option to operate as an additional input component.

Embodiments of the electromagnetic signal detector 106 include one or more communication elements to facilitate short-range communication capabilities. In some embodiments the electromagnetic signal detector 106 may include a communication element to facilitate wide area communication. The electromagnetic signal detector 106 may exchange information with the mobile communication device 104 using the short-range or near-field communication capabilities embedded in each component. In some embodiments, the electromagnetic signal detector 106 may optionally exchange information with the vehicle camera 102 using the short-range or near-field communication capabilities embedded in each component. In some embodiments, information from the electromagnetic signal detector 106 is passed to the vehicle camera 102 through communication first to the mobile communication device 104 then second from the mobile communication device 104 to the vehicle camera 102.

The communication element facilitates the exchange of information or data between the electromagnetic signal detector 106, the mobile communication device 104 and the vehicle camera 102. This provides operational capabilities for the vehicle camera system 100 discussed further herein.

For example, the electromagnetic signal detector 106 may detect a radar signal and transmit a communication to the mobile communication device 104 regarding the detected signal. The mobile communication device 104 may send an instruction to flag the current video based upon the radar signal detection and send a predicted alert level based upon a signal analysis and prior prediction of an alert level for the location to the vehicle camera 102. The vehicle camera 102 may display the predicted alert level and flag the video corresponding with the signal detection.

For another example, the mobile communication device 104 may operate as a user interface for the vehicle camera 102 and the electromagnetic signal detector 106 to improve the efficiency of operating multiple vehicle devices. Alternatively, user interface of the vehicle camera 102 may operate as a singular user interface for all of the components in the vehicle camera system 100. Using a single device as the user interface may also increase safety by eliminating the need for a user to reach for multiple different devices to manage multiple operations.

In some embodiments, the electromagnetic signal detector 106, mobile communication device 104 and the vehicle camera 102 are operable to communicate collectively in real-time or near real-time. For example, the electromagnetic signal detector 106 may detect a signal and concurrently transmit the signal information to both the vehicle camera 102 and the mobile communication device 104. At the same time, the mobile communication device 104 may transmit a concurrent signal to the electromagnetic signal detector 106 and the vehicle camera 102 indicating a predicted false alert at the current vehicle location associated with a specific radar signal. The vehicle camera system 100 components may each compare the detected signal characteristics to the false alert radar signal characteristics to determine if the signal characteristics match and the detected signal is a false alert. Based upon the false alert determination, none of the components provide an alert. Finally, the vehicle camera 102 may send the corresponding video recording to the mobile communication device 104 which sends the recording with the corresponding detected signal information to a remote server for further post processing of the video recording.

In some embodiments, the communication capabilities of one or more of the vehicle camera 102, the mobile communication device 104 and the electromagnetic signal detector 106 may be utilized to automatically execute the vehicle camera system 100 and/or the method of operation of the vehicle camera 102, the mobile communication device 104 and/or the electromagnetic signal detector 106 when two such vehicle camera system 100 components are within a certain range, such as the communication range of the short-range communication standard. For example, the vehicle camera 102 and the mobile communication device 104 may contain paired radio frequency identification ("RFID") components. When the range between the vehicle camera 102 and the mobile communication device 104 is within the RFID signal range, the RFID components cause an application within mobile communication device 104 to automatically execute the system and/or method. In some embodiments, the automatic execution of the system begins when the mobile communication device 104 is within an operational range of another vehicle camera system 100 component. For example, once the mobile communication device 104 is within range of the vehicle camera 102 and the electromagnetic signal detector 106 located in a vehicle, the devices could "pair" via the BLUETOOTH standard. As one skilled in the art will recognize, the communication capabilities may be used to automatically execute all or portions of the vehicle camera system 100 and the operations thereof. In addition, one skilled in the art will recognize that the communication capabilities may be used to permit, preclude or and/modify other operations of the vehicle camera system 100 and remain within the scope and spirit of the invention. For example, when the vehicle camera system 100 is active, the electromagnetic signal detector 106 may turn off alert outputs to prevent unnecessary duplication of the alert output among multiple devices.

When the vehicle camera system 100 devices are paired, the vehicle camera system 100 may operate using collective settings coordinating the actions and operations of each component in the vehicle camera system 100. For example, when the vehicle camera 102, the mobile communication device 104 and the electromagnetic signal detector 106 are paired, the vehicle camera system 100 may use the display output of the vehicle camera 102 to show predicted alerts and the speaker 124 of the mobile communication device 104 to provide audible alerts. The other visual and audio outputs available to the vehicle camera system 100—such as the display 128 and a speaker of the electromagnetic signal detector 106 and/or a speaker on the vehicle camera 102—may also be used. In addition, the vehicle camera system 100 may use control buttons on the vehicle camera 102 for the user input. In addition, the vehicle camera 102 may receive voice instructions through a microphone in the vehicle camera 102. In some embodiments, the voice instructions may be received in a microphone in the mobile communication device 104.

In some embodiments, the electromagnetic signal detector 106 may be designed to use the user input and output elements of other components in the vehicle camera system 100. Such an embodiment of the electromagnetic signal detector 106 may not include any user input or output elements and may be referred to as a "black box" design. Because the user does not need to directly see or touch the "black box" design during operation, the "black box" design may be located anywhere in the vehicle where the electromagnetic signal detecting elements are operable to detect electromagnetic signals and the communication elements are operable to communicate with other components in the vehicle camera system 100.

In some embodiments, the vehicle camera 102 may be integrated into a common housing with another device, such as the electromagnetic signal detector 106, a navigation component and/or another in-vehicle device. Embodiments of the integrated vehicle camera device may include one or more communication elements facilitating communication with the mobile communication device 104.

Figure 2:
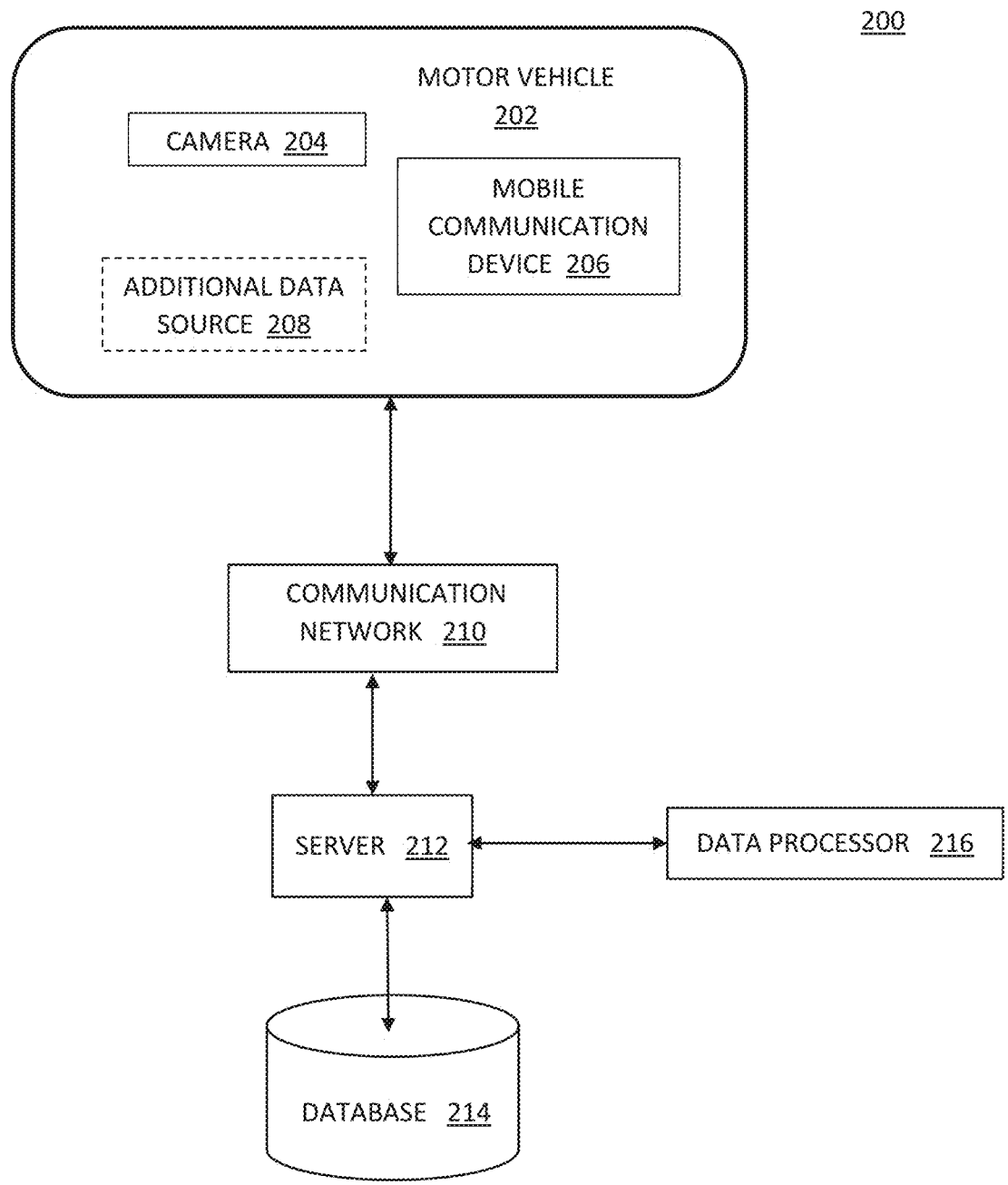
FIG. 2 is a block diagram depicting an embodiment of a system of the present disclosure.

FIG. 2 illustrates a block diagram of system 200 showing an embodiment of a networked vehicle camera system. The depicted system 200 includes a motor vehicle 202 having in-vehicle components including a camera 204, a mobile communication device 206 and an additional data source 208. The additional data source 208 is illustrated in broken lines to indicate that it is an optional component. In some embodiments, the in-vehicle components may only include the camera 204 and the mobile communication device 206. Alternatively, some embodiments may only include the camera 204 and/or an integrated camera device in place of camera 204. The system 200 also includes a communication network 210 connected to one or more of the in-vehicle components with a server 212. The server 212 is further associated with a database 214 and a data processor 216. As one skilled in the art will recognize, the system 200 may include any number of motor vehicles 202, cameras 204, mobile communication devices 206, additional data sources 208, communication networks 210, servers 212, databases 214 and data processors 216 and should not be limited to the illustrative example provided in FIG. 2.

In this embodiment, the camera 204, the mobile communication device 206 and the additional data source 208 operate as an in-vehicle camera system similar to the vehicle camera system 100 described in conjunction with FIG. 1 above. As an initial matter, the camera 204 and the mobile communication device 206 may operate similar to the vehicle camera 102 and mobile communication device 104 described above. In this embodiment, the additional data source 208 may be a vehicle information system, an electromagnetic signal detector—such as the electromagnetic signal detector 106 discussed above—or another data source. For example, the additional data source 208 may be a navigation component, a diagnostic system of the motor vehicle 202, an alarm sensor, a weather sensor or another type of sensor or component that may provide data to the in-vehicle camera system. For another example, the additional data source may be a vehicle information system of the motor vehicle 202 operable to provide vehicle operation data, such as speed, acceleration, braking information, vehicle diagnostic information, vehicle user interface information (i.e. volume control information, cruise control information, etc.). Although one additional data source 208 is shown, the motor vehicle 202 and the in-vehicle camera system may include more than one additional data source 208. For example, an in-vehicle camera system may include the camera 204, the mobile communication device 206, a radar detector, a vehicle information system and a navigation unit.

In some embodiments, the in-vehicle components each include a short-range communication element to facilitate communication between one or more in-vehicle components. For example, the camera 204 and the mobile communication device 206 may include communication elements for wireless communication using the BLUETOOTH communication standard. In addition, at least one of the in-vehicle components includes a communication element to facilitate wide area communication capabilities. In the system 200, the wide area communication capabilities facilitate communication over the communication network 210.

The communication network 210 may comprise one or more public networks, private networks or combinations of public and private networks operating on and/or in conjunction with a cellular telephone network, a satellite network, a Wi-Fi, another wide-area wireless network, the Internet, and/or any other wide-area communication network. As used herein, communication network 210 may include the protocols, controls, systems, and/or components for facilitating communication among different types of networks. For example, the mobile communication device 206 may operate on a Wi-Fi network at a local book store to access the Internet in order to communicate with server 212. In some embodiments which include multiple devices with wide-area communication capabilities, the devices may operate on the same communication network 210 and/or different communication networks 210.

In some embodiments, one of the in-vehicle devices may access an intermediate device external to the vehicle using a short-range communication capability wherein the intermediate device facilitates communication over the communication network 210. For example, when the motor vehicle 202 is parked in the garage of a house, the additional data source 208 may facilitate communication over a BLUETOOTH communication standard to a router in the house which facilitates a connection to the Internet. In such an embodiment, the in-vehicle camera system may exchange information with the server 212 when the user's mobile communication device 206 is removed from the motor vehicle 202 and the remaining in-vehicle components only include short-range communication elements. The router may automatically pair with one or more of the in-vehicle devices when the devices are within range as discussed above and automatically initiate an exchange of data.

The server 212 may be a centralized server that aggregates information from the in-vehicle camera system and other sources—such as the system described in U.S. Pat. Nos. 8,970,422 and 8,842,004 and U.S. Patent Application Publication No. 2013/0214939. In addition, other sources of information and data may be collected and aggregated from a roadway video database, a traffic analysis database, a social media database, map databases, emergency responder databases, weather databases (such as the National Oceanic and Atmospheric Association ("NOAA") database for weather warnings), work-zone databases, law enforcement equipment use in a geographic location (such as a database identifying types of radar and laser guns in use for a given county) and/or other databases and systems. In some embodiments, the data is automatically received and/or accessed by the server 212. In some embodiments, a system administrator or another user will initiate the transfer of additional information to the server 212. For example, a user may record a traffic incident from their porch and upload the recording to the server 212. In some embodiments, the in-vehicle camera system will automatically transmit video and additional data to the server 212 based upon a critical trigger occurrence. In some embodiments, the system 200 will operate to process the video and data in conjunction with the receipt of the data to determine the nature of the critical event and if an emergency response is needed to address the critical event.

Each of the in-vehicle camera system and the server 212 has the ability to initiate the process of sending or receiving data. The data may relate to video recordings, location, speed, and/or acceleration of the motor vehicle 202, law enforcement activity, detectable electromagnetic signals, traffic conditions, other hazards or alerts, traffic incidents, emergency events, potential theft events and/or the status of the in-vehicle devices, such as a failure indication from the vehicle diagnostic system in the motor vehicle 202. Video recordings from camera 204 associated with the data or the time of an event, action and/or alert may be identified and flagged at the time of the occurrence based upon a user input or automatically by the in-vehicle system based upon a trigger condition or electronic instruction. Alternatively, the video recording from camera 204 associated with the data or the time of an event, action and/or alert may be sent to the server 212 for post-processing to identify and flag the video recording and/or specific points within the video recording. As one skilled in the art will recognize, law enforcement activity includes speed traps, speed cameras, red light cameras, and any law enforcement personnel and/or device enforcing traffic laws. When data associated with law enforcement activity is sent to the server 212 with a video recording, the server 212 may use video recognition to determine if the video shows the corresponding law enforcement activity, such as a red light camera or law enforcement vehicle.

The data may also include driving patterns of motor vehicle 202 and/or specific driving patterns of individuals, including patterns relating to the driver's typical reaction to specific alerts under specific circumstances. For example, the system 200 may detect that the vehicle in which it is operating suddenly decelerated in response to a specific electromagnetic signal. This action by the vehicle could signify that the operator perceived an actual hazard or law enforcement activity, indicating that the signal is a legitimate source. Accordingly, the camera 204 may save the video recording associated with the deceleration and electromagnetic signal and transmit the video to the server 212 for further analysis. Video analysis may improve the capability for the server 212 to provide customized data, predicted alerts and other information for a specific motor vehicle 202 and/or individual using motor vehicle 202.

In some embodiments, the camera 204 and server 212 may leverage the various communication standards of the mobile communication device 206 to communicate data in real-time or may communicate data based upon a schedule, a triggering event (such as reaching a data quantity threshold or a data storage size threshold), and/or a combination of a schedule and triggering event and remain within the scope and spirit of the invention. For example, the camera 204 may record an event as a video that is saved based upon a user selection and stores the video in internal memory, such as a buffer. Once a threshold quantity of data is reached or surpassed in the buffer, the camera 204 communicates saved videos and other data to the mobile communication device 206 via BLUETOOTH, and the mobile communication device 206 communicates the video and other data to the server 212 via a telephone communication network. For another example, the mobile communication device 206 may receive and store data from the camera 204 and additional data source 208 in an internal buffer, and wait until a threshold quantity of data is reached or surpassed in the buffer before communicating the data to the server 212 via a telephone communication network. For yet another example, the camera 204 may stream a video feed in real-time (or near real-time) to the server 212 and/or the database 214. The real-time video feed may be transmitted directly using a wide-area communication element integrated into some embodiments of the camera 204. In other embodiments, the real-time video feed may be transmitted indirectly by leveraging a wide-area communication element of the mobile communication device 206 which is wirelessly connected to the camera 204 over a short-range communication standard.

Upon receipt of data, the server 212 may store data into physical or electronic memory in the database 214, which may be part of the server 212 or separate from the server 212. The stored data may be aggregated and organized within the database according to source, content, flags and other characteristics of the data.

The server 212 is associated with a data processor 216 that executes analysis algorithms to periodically collect, sort, organize and analyze the data. The data processor 216 may be part of the server 212 or separate from the server 212. The result of the analysis conducted by the data processor 216 is stored in database 214. The results may be stored as new records within the database 214 or within a partitioned section of the database 214. The data may be associated with database 214, but as one skilled in the art will recognize, the data processor 216 may incorporate or otherwise analyze data from sources other than the database 214 and remain within the scope and spirit of the invention. The data processor 216 may be designed to conduct statistical and/or predictive calculations based upon data available to the data processor 216 relating to the likelihood of future events including threats, hazards, alerts, law enforcement speed monitoring activity and/or traffic conditions. In the context of the present invention, the terms threat, predicted alert and predictive alert may be used interchangeably to refer to the likelihood (i.e. probability) that a user of the present invention will encounter a police radar unit, a road hazard, a change in the posted speed limit, or other event that will trigger an alert to be provided to the user of the in-vehicle camera system.

In addition, embodiments of the data processor 216 are designed to conduct video recognition analysis to identify additional data relevant to the statistical and/or predictive calculations. For example, the data processor 216 may review video recordings that are associated with a geographic area to determine if the video shows events, threats and/or false signal sources at the geographic area. The data processor 216 may use the additional identified data from the video to modify a predicted alert level for the geographic area and store the predicted alert level for that geographic area in database 214. The database 214 may contain predicted alert levels for multiple geographic areas. In addition, an image or clip from the video recording showing the identified event, threat or false signal source may be stored in conjunction with the predicted alert level associated with a geographic area. In some embodiments, the predicted alert is stored with the video clip and additional support for the prediction in a common file. In some embodiments, the predicted alert is a single file that is associated with the supporting data via database linking and/or organization protocols. In such an embodiment, the file size of the predicted alert may be smaller in order to efficiently and quickly transmit the file from the server 212 to the in-vehicle camera system.

In some embodiments, the data processor 216 is designed to conduct post-processing of a video recording from camera 204. For example, the data processor 216 may collect information related to the video recording received from the camera 204—such as location and local time information from the mobile communication device 206—and embed the additional information into the recording. For another example, the data processor 216 may modify the video file based upon user settings—such as removing the audio file and compressing the video file. In some embodiments, the data processor 216 may operate to compile multiple video clips from the camera 204 into a single video. For example, the camera 204 may transmit a series of video clips with data related to the order of the video clips to the server 212 and the data processor 216 may create the final video by concatenating the video clips based on the order data. In some embodiments, the video clips comprising a final video may leave out certain intermediate clips and/or be a selection of video clips that were independent from each other. For example, a user may send a series of video clips associated with multiple locations of a favorite restaurant the user visited.

In some embodiments, the in-vehicle camera system may receive operation instructions from the server 212 over the communication network 210. For example, the server 212 may provide instructions for the camera 204 to record a video of a side street which the motor vehicle 202 is approaching in order to analyze whether a predicted threat is located on the side street. The instructions may be received by the mobile communication device 206 and sent to the camera 204. Once received by the camera 204, the camera 204 may activate electromechanical controls to move the focal point of the camera 204 to capture images down the side street. The camera 204 may then transmit the video recording of the side street along with an embedded flag indicating the location and view associated with the recording to the server 212 for further analysis. The camera 204 may return to the original focal point after recording the images as instructed by the server 212. In some embodiments, the focal point instructions for the camera 204 may be included with predicted alerts having known locations to increase the likelihood that the camera 204 records the source of the predicted alert.

Figure 3:
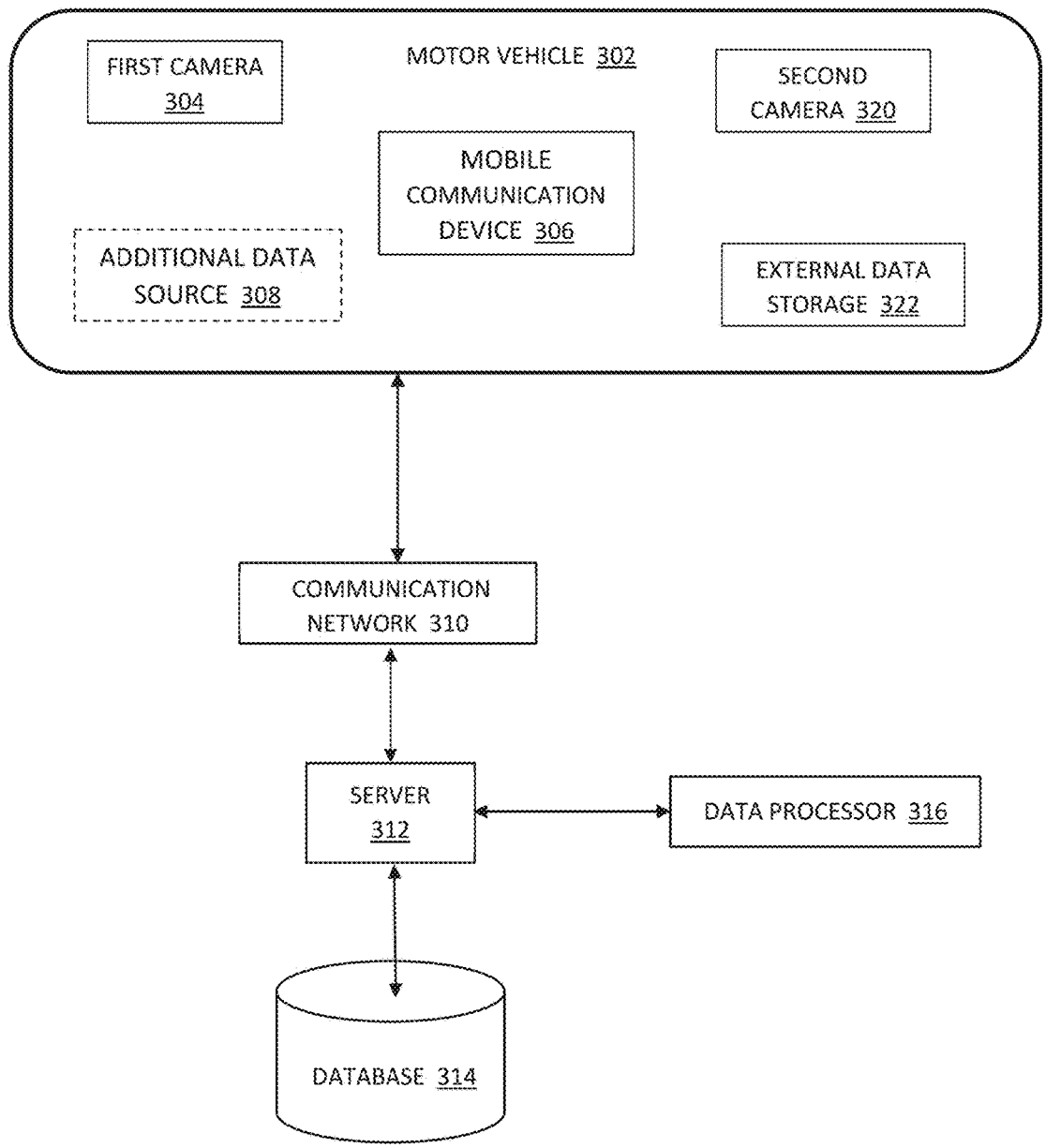
FIG. 3 is a block diagram depicting another embodiment of a system of the present disclosure.

FIG. 3 illustrates a block diagram of system 300 showing an embodiment of a networked vehicle camera system. The depicted system 300 includes a motor vehicle 302 having in-vehicle components including a first camera 304, a mobile communication device 306, an additional data source 308, a second camera 320 and an external data storage 322. The additional data source 308 is illustrated in broken lines to indicate that it is an optional component. The system 300 also includes a communication network 310 connected to one or more of the in-vehicle components with a server 312. The server 312 is further associated with a database 314 and a data processor 316. As one skilled in the art will recognize, the system 300 may include any number of motor vehicles 302, cameras 304 and 320, mobile communication devices 306, additional data sources 308, external data storage 322, communication networks 310, servers 312, databases 314 and data processors 316 and should not be limited to the illustrative example provided in FIG. 3.

The system 300 is similar to system 200 discussed above other than the addition of second camera 320 and external data storage 322. Similarly, the first camera 304, the mobile communication device 306, the additional data source 308, the second camera 320 and the external data storage 322 in this embodiment operate as an in-vehicle camera system. The additional data source 308 may be an electromagnetic signal detector, a navigation component, a diagnostic system of the motor vehicle 302, an alarm sensor, a weather sensor or another type of sensor or component that may provide data to the in-vehicle camera system. Although one additional data source 308 is shown, the motor vehicle 302 and the in-vehicle camera system may include more than one additional data source 308.

In this embodiment, the first camera 304 and the second camera 320 are located at different locations in the motor vehicle 302 and provide different video feeds. For example, the first camera 304 may be a dash camera having a forward view from the motor vehicle 302 and the second camera 320 may be positioned to record the passenger cabin of the vehicle. In such an embodiment, the second camera 320 may be oriented to view specific passengers, such as kids in the back seat, including for example, those in a rear-facing child seat. For another example, the first camera 304 may be a vehicle reverse camera located in the rear bumper and the second camera 320 may be a dash camera with a forward viewing angle. In some embodiments, the motor vehicle 302 may contain a plurality of cameras 304 and 320 viewing multiple perspectives around the motor vehicle 302. In some embodiments, one of the cameras 304 and 320 may operate to collect specific information within a vehicle. For example, the second camera 320 may be located in the back of an ambulance to record the incoming patient and medical attention being provided to the incoming patient, and the video feed may be sent to the hospital in order to prepare for the incoming patient. In such an embodiment, additional patient sensor information, such as patient temperature, heart rate, blood pressure, and other patient information, may be sent in conjunction with the video feed.

In some embodiments, the first camera 304 and/or the second camera 320 may include a display showing the video feed from the first camera 304, the second camera 320 or both cameras 304 and 320. For example, a parent may set the display to show one or more video feeds of the kids in the vehicle. A user interface controlling the video display may allow a user to select which video output display to provide. In some embodiments, the video output is displayed on the mobile communication device 306 and/or another in-vehicle component of the vehicle camera system.

This embodiment also includes the external data storage 322 in the motor vehicle 302. The external data storage 322 may be any hardware memory or storage component operable to store electronic data. In some embodiments, the external data storage 322 may be integrated with an additional data source 308 such as an on-board vehicle computer or digital music player built into the motor vehicle 302. In some embodiments, the external data storage 322 is located in a remote location of the vehicle and wirelessly communicates with other in-vehicle components using a short-range communication element. When the external data storage 322 is actively communicating with another in-vehicle camera system component, data may be stored in the external data storage 322 consistent with settings in the in-vehicle camera system settings. For example, the first camera 304 may transmit the active video feed to the external data storage 322 during operation for the external data storage to save without using any memory space in the first camera 304. In some embodiments, the external data storage 322 may operate as a redundant storage component. The use of the external data storage 322 for redundant storage may provide additional benefits for theft prevention and/or recovery. For example, the cameras 304 and 320 may record images and/or other data relating to a theft and store the data in the external data storage 322 which is located in a secured, remote location in the motor vehicle 302. In some embodiments, a theft event may trigger additional data from other components in the motor vehicle to be sent to the external data storage 322—such as distance traveled information, acceleration and deceleration events, navigation entries and/or current location information. The external data storage 322 may then transmit the data and recordings to the server 312, which may provide notice to owner of motor vehicle 302, the police and/or another entity and facilitate access to the data from the external data storage 322. In addition, the external data storage 322 may be designed to protect data during events which may harm or destroy the cameras 304 and 320—such as fires, traffic accidents and/or other events.

In some embodiments, the in-vehicle components each include a short-range communication element to facilitate communication between one or more in-vehicle components. For example, the first camera 304, the second camera 320 and the mobile communication device 306 may include communication elements for wireless communication using the BLUETOOTH communication standard. In addition, at least one of the in-vehicle components includes a communication element to facilitate wide area communication capabilities. For example, the mobile communication device 306 and the external data storage 322 may contain communication elements for cellular communication. In the system 300, the wide area communication capabilities facilitate communication over the communication network 310.

In this embodiment, the communication network 310, the server 312, the database 314 and the data processor 316 generally operate as described with respect to system 200 discussed above. However, the additional data available from the second camera 320 facilitates additional options for the analysis conducted by the data processor 316 and the use of external data storage 322 allows for additional system functionality.

The data processor 316 may analyze corresponding video feeds from both the first camera 304 and the second camera 320. Incorporating a second camera view for analysis may provide an alternative perspective which shows information not available in the view of the first camera 304. For example, while the first camera 304 facing forward along a road may not clearly show a police vehicle hidden behind an obstruction, the second camera 320 facing rearward may provide a clear view of the police vehicle as the motor vehicle 302 is driving away from the location. Accordingly, the data processor 316 may determine the presence of a threat is confirmed based upon the second camera 320 recording while the presence of a threat is inconclusive based upon the first camera 304 recording. For another example, during a collision of motor vehicle 302 caused by another vehicle from behind the motor vehicle 302, the first camera 304 facing forward may provide only limited data ancillary to the collision—such as movement of the motor vehicle 302 caused by the collision and the surrounding environment. However, the second camera 320 which is rear facing showing the passenger compartment may show certain elements of the collision itself and reactions of the passengers within motor vehicle 302. This additional information may be relevant to police analysis of the collision and for medical professionals assessing injuries to passengers in motor vehicle 302.

The inclusion of external data storage 322 may allow the triggers for exchanging information between the in-vehicle camera system components and the server 312. Because the external data storage 322 may store significant amounts of data from multiple in-vehicle components, the data may not need to be transmitted to the server 312 as often due to storage size thresholds. In addition, the server 312 may send more data to the external data storage 322 for the in-vehicle system components to use without needing to connect with the server 312. For example, the server 312 may provide predicted alert information including characteristics for identifying the alerts for a large geographic area to the external data storage 322. The mobile communication device 306 may access the predicted alert information and compare the specific location information for the predicted alerts with the current location determined by the mobile communication device 306 to identify potentially relevant predicted alerts. When a predicted alert is applicable to the current (or approaching) geographic location of the mobile communication device 306, the mobile communication device 306 will transmit the predicted alert to the first camera 304 to display the predicted alert to the user.

Figure 4:
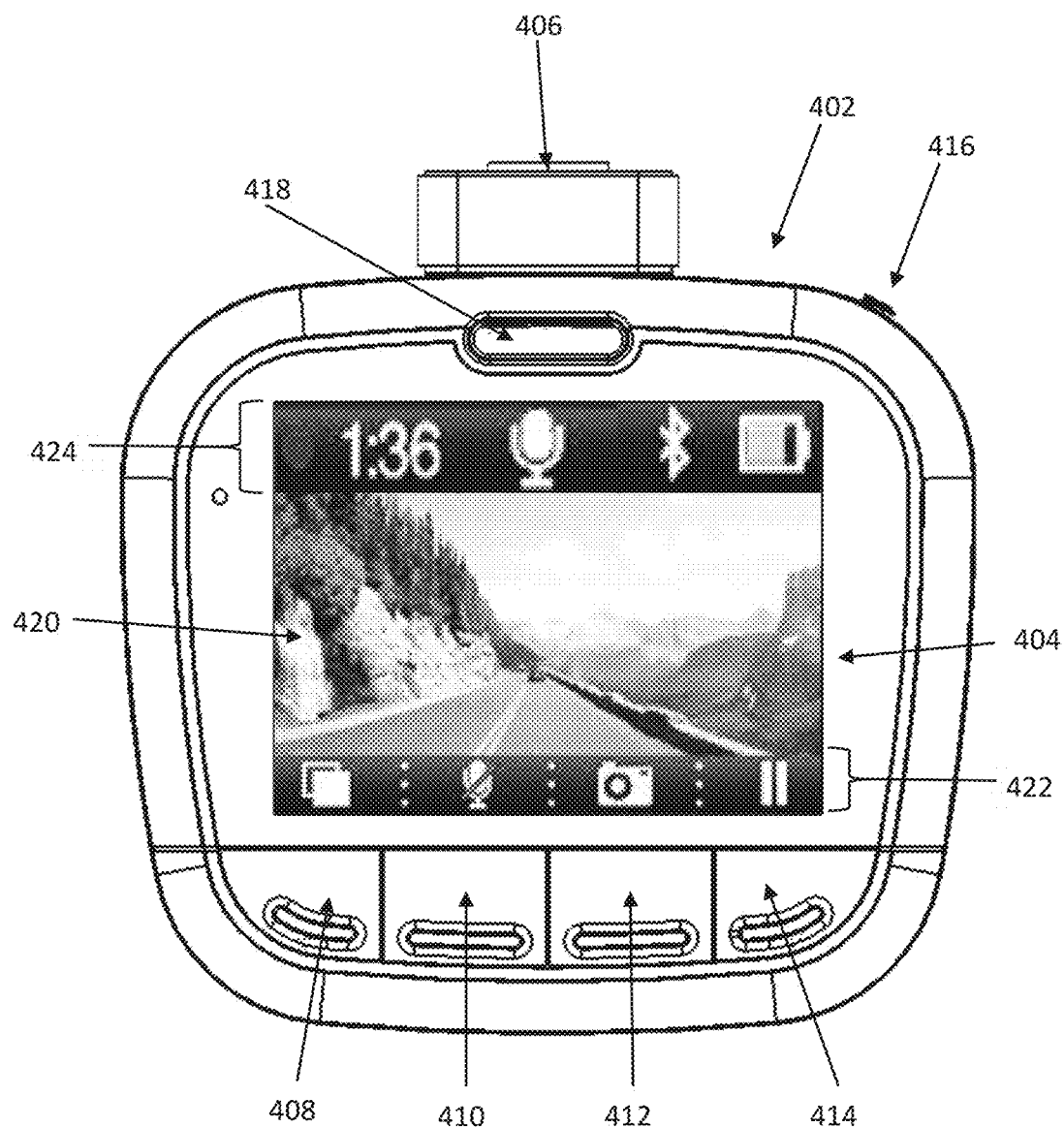
FIG. 4 is an embodiment of a vehicle camera display of the present disclosure.
Figure 5:
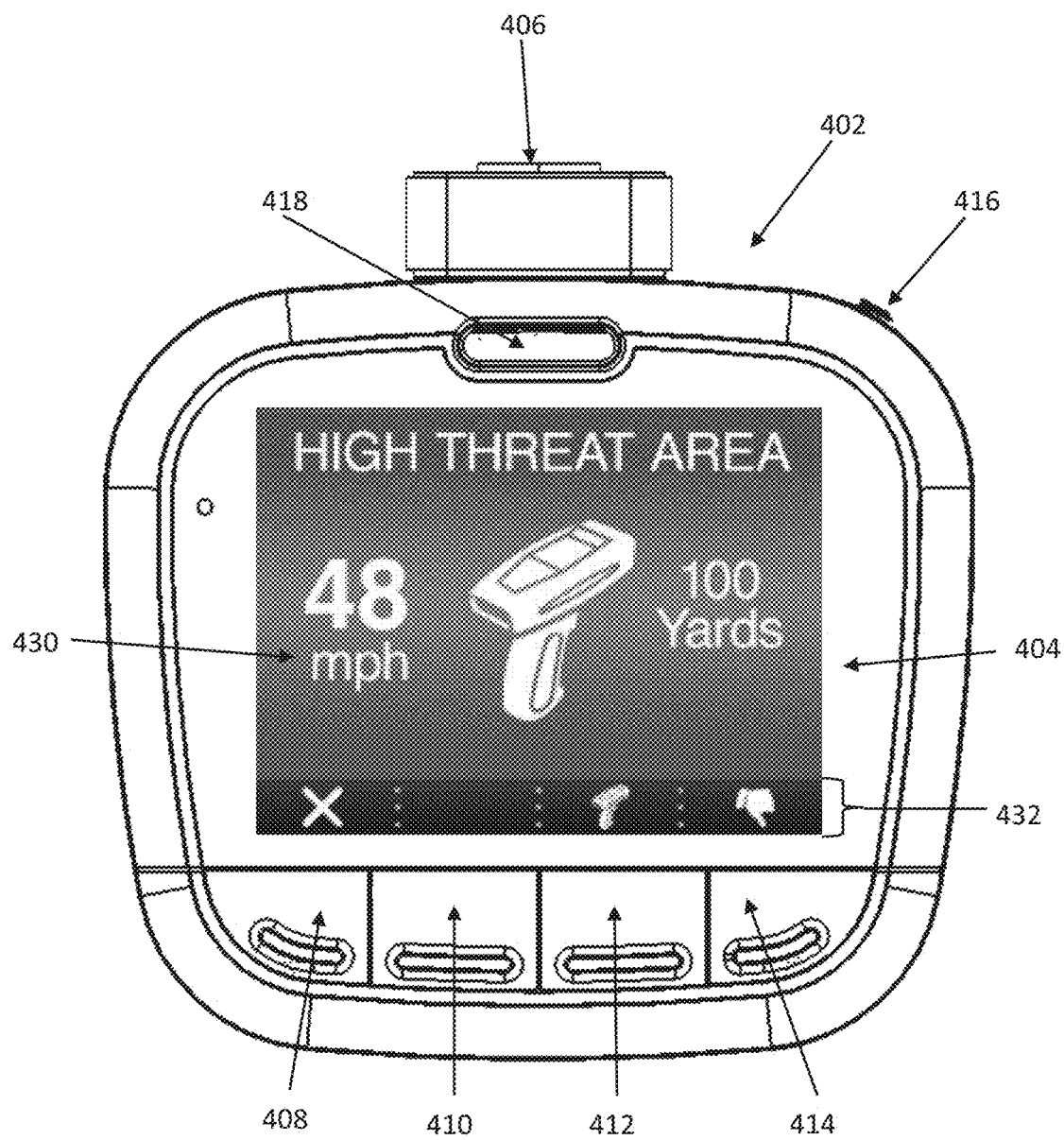
FIG. 5 is an embodiment of the present disclosure showing a vehicle camera display showing an embodiment of an alert screen.
Figure 6:
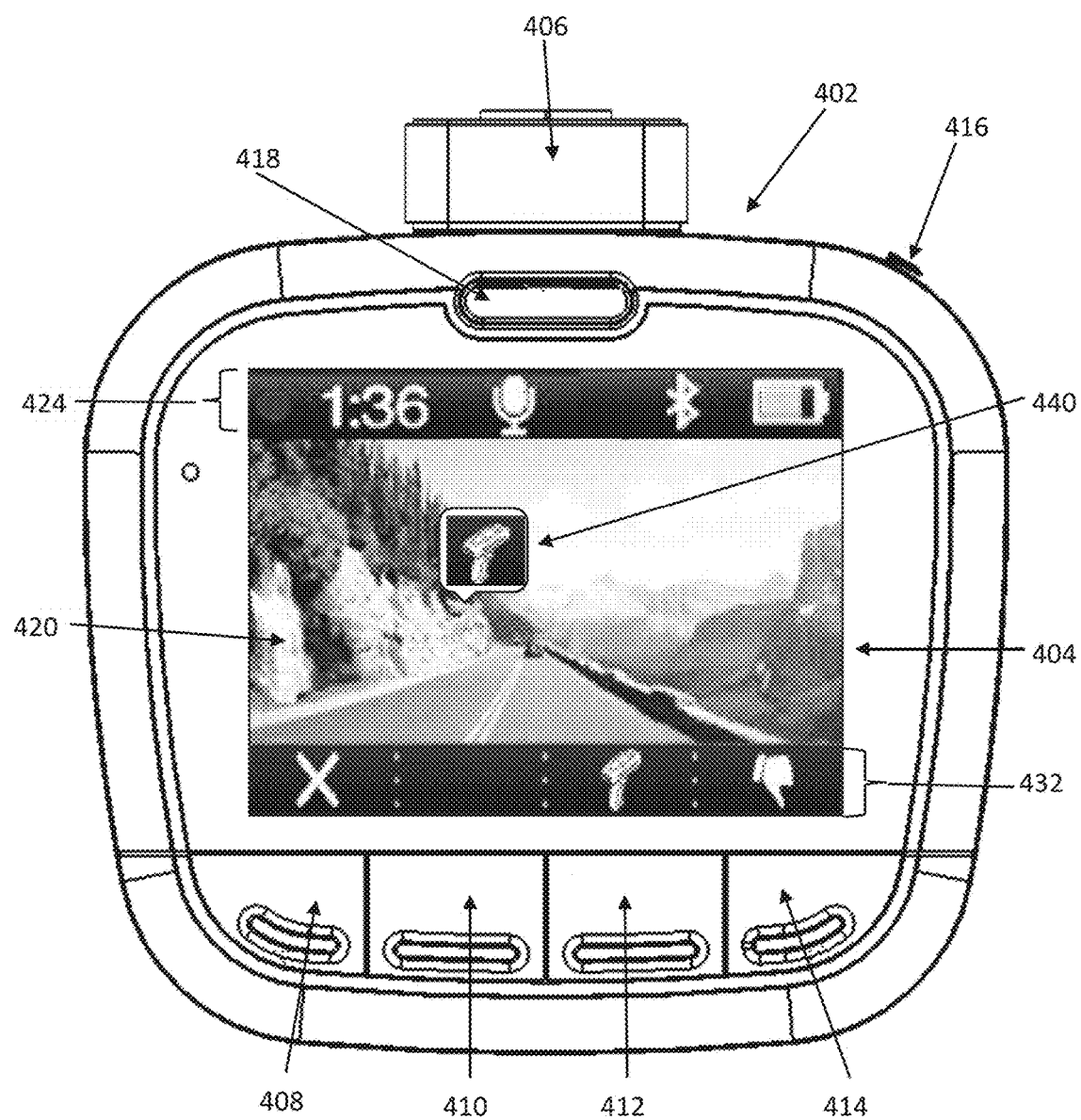
FIG. 6 is an embodiment of the present disclosure showing a vehicle camera display showing an embodiment of an alert icon.

FIGS. 4-6 show a back view of an illustrative embodiment of a vehicle camera 402 for discussion and the disclosure is not limited to the embodiment of vehicle camera 402 shown. The vehicle camera 402 includes a display 404, a connection 406 and buttons 408, 410, 412, 414, 416 and 418. In some embodiments, the back of the vehicle camera 402 may include additional and/or alternative elements, such as additional controls, a microphone, a secondary camera lens, a speaker and/or other elements. In some embodiments, the elements shown on the back of the vehicle camera 402 may be located elsewhere on the vehicle camera 402. In addition, embodiments of the vehicle camera 402 may include a different number of buttons 408-418, displays and/or connections 406 than shown in FIGS. 4-6. In addition, the vehicle camera 402 includes a communication element and is designed to operate as part of a vehicle camera system, such as the ones described above.

The display 404 provides a visual output for a user of the vehicle camera 402. In some embodiments, the display may include touch screen capabilities to also operate as an input for the vehicle camera 402. In such an embodiment, one or more of the buttons 408-418 may not be part of the vehicle camera 402. In some embodiments, the vehicle camera 402 may modify the display 404 based upon data from external sources, such as a mobile communication device. For example, the brightness of display 404 may change based upon light sensor data, heading, time of day and/or other data. As discussed further below, illustrative screens are shown on the display 402 for each of FIGS. 4-6 to illustrate operations of the vehicle camera 402.

The connection 406 is shown at the top of the vehicle camera 402 shown. The connection 406 is similar to the connection 110 discussed with respect to FIG. 1 above. Similarly, the connection 406 may facilitate connecting the vehicle camera 402 to a mount in or on a motor vehicle. For example, a mount may be adhered to the front windshield of a vehicle and attached to connection 406 to hang the vehicle camera 402 from the dash of a vehicle. In some embodiments, the vehicle camera 402 may be mounted in an inverted orientation such that the connection 406 is located at the bottom of the vehicle camera 402. In such an orientation, the vehicle camera 402 may operate to invert the visual output shown on the display 404. In some embodiments, the vehicle camera 402 will separately invert and/or rearrange icons and sections of the visual output displayed. For example, the vehicle camera 402 may move the icons shown in operation bar 422 to the top of the display 404 and arrange the icons to maintain the correlation with each of buttons 408-414.

In the embodiment shown, the buttons 408-414 illustrate operation control buttons corresponding to the function icons shown in operation bar 422 shown in the display 404. Each button 408-414 is operable to select the function shown in the corresponding icon in operation bar 422. The effect of each button 408-414 may change with changes in the operation bar 422. In some embodiments, the vehicle camera 402 may include alternative controls in place of one or more of the buttons 408-414. For example, instead of buttons 408-414, the display 404 may facilitate touch screen controls allowing each icon shown in operation bar 422 to be selected. In such an embodiment, the size of display 404 may be increased to cover the area comprising the buttons 408-414. In some embodiments, specific functions may be assigned to one or more of the buttons 408-414 that do not change with the display 404. For example, button 408 may always operate as a microphone muting button.

In this embodiment, the button 416 operates as a power button to turn the vehicle camera 402 on and off. In some embodiments, the button 416 may operate to control a different function of the vehicle camera 402. For example, the button 416 may be used to set a reminder flag in a recording to act as a reminder for the user during playback of the video.

Button 418 in this embodiment operates as an emergency record button to allow a user to manually set a recording to a locked state. The vehicle camera 402 will operate to maintain any vehicle having a locked setting. For example, the vehicle camera 402 operates in a default setting to record video clips in a loop whereby once the memory is full, the vehicle camera 402 will begin to loop through the memory overwriting the oldest video clips. When recording video clips, the vehicle camera 402 will not overwrite the locked video clip. In some embodiments, the button 418 may operate to control a different function of the vehicle camera 402. For example, the button 418 may be used to erase the preceding video clip.

In some embodiments, the vehicle camera 402 may include additional buttons or controls. For example, the bottom of the vehicle camera 402 may include a reset button to reset the default settings of the vehicle camera 402. In addition, one skilled in the art will recognize that the buttons 408-418 may be replaced with alternative user interface elements and remain within the scope and spirit of the disclosure. For example, one or more of the buttons 408-418 may be replaced and/or modified with other user controls such as knobs, slide controls, switches, voice controls, touch-screen applications and/or other components.

In FIG. 4, the display 404 is partitioned into sections including the video view section 420, the operation bar 422 and the information bar 424. In some embodiments, the display 404 may be partitioned in a different number of sections and/or in different formats than the layout illustrated. In some embodiments, the layout on the display 404 may vary depending on the screen. One or more aspects of the layout for the display 404 are customizable. When the vehicle camera 402 is paired with another component as part of a vehicle camera system, the layout and/or portions of the layout may change based upon settings of the vehicle camera system. For example, the operation bar 422 may not be displayed in embodiments of the vehicle camera system using the mobile communication device as the user control for the vehicle camera 402.

In this embodiment, the video view section 420 shows the currently recording view of the vehicle camera 402. For example, when the vehicle camera 402 is a dash camera facing forward, the video view screen 420 is showing the forward view from the windshield of the vehicle. In some embodiments, the video view screen 420 may be used as a video playback to show previously recorded video clips. In multi-camera systems, the video view screen 420 may be used to show the current camera recording from another camera in the multi-camera system.

The operation bar 422 depicts icons associated with functions of the vehicle camera 402. In this embodiment, each icon in the operation bar 422 corresponds with a button 408-414 which is operable to select the operation indicated by the corresponding icon. The icons shown in this embodiment may represent a screen on/off operation corresponding to button 408, a microphone control operation corresponding to button 410, an image capture operation associated with button 412 and a pause/record operation associated with button 414. A user may use the buttons 408-414 to control the operations represented by the icons in the operation bar 422. For example, actuating the button 408 once will turn the screen off and actuating the button 408 another time will turn the screen on again. Actuating button 410 may mute the audio input, otherwise control operation of the microphone or alter management of the audio file within the vehicle camera 402. Pressing button 412 may cause the vehicle camera 402 to save a still image from the video recording at the time the button 412 is actuated. Button 412 may operate as a manual control to record video or pause the recording. As illustrated further herein, the options on the operation bar 422 may change and the functions triggered by buttons 408-414 may change with the icons on the operation bar 422.

The information bar 424 in this embodiment show icons indicating the current status of certain features of the vehicle camera 402. In this embodiment, the information bar 424 shows, from left to right, a recording indicator, the current time, an active microphone (indicating that audio is recording), a wireless connection indicator and a battery charge indicator. In some embodiments, additional and/or alternative information may be shown in the information bar 424. In some embodiments, the information bar 424 may not be shown on the display 404. Alternative output options may provide the status information to a user instead of or in conjunction with the information bar 424. For example, a series of LED indicators may be used to indicate recording status and wireless connectivity status of the vehicle camera 402.

FIG. 5 shows another back view of vehicle camera 402 with an alternative visual output shown on display 404. In this embodiment, the display 404 is showing an alert screen 430. As shown, the alert screen 430 indicates a high threat area approaching. In this embodiment, the alert screen 430 shows a variety of information indicating the predicted alert for the approaching area, including the predicted alert level, type of alert, driving speed and distance to the alert area. In addition, the displayed predicted alert may vary to show multiple predicted alerts if applicable.

First, this alert screen 430 shows the approaching area is designated as a "HIGH THREAT AREA". In addition to or instead of the words shown, the high threat indication may be indicated by the color or background of the visual output and/or through an audible output in some embodiments. While the illustrated alert level is a high threat area, alternative threat levels and designations may be provided. For example, the predicted alert may be limited to an intermediate or minimal threat level. In addition, the background may further indicate the expected location for the threat. For example, the background may highlight the anticipated side of the road for the threat in a brighter shade of the warning color.

Second, this alert screen 430 shows a radar/laser gun icon to indicate that the predicted threat relates to a radar/laser speed monitored area. Alternative threats or notices may be indicated by different icons or display characteristics. For example, a red-light camera threat may be depicted with a red-light icon. For another example, an active police area may be indicated by a badge icon. Similarly, school areas may be indicated by a child or school bus icon and a hospital may be indicated with a red cross icon. If multiple alerts are predicted for the approaching geographic location(s), the display 404 may show multiple threat types, alternatively flash each threat type, provide a distinct icon to indicate multiple threats and/or otherwise indicate multiple threats. For example, the alert screen 430 may show a school icon and a badge icon to indicate an active school zone that is likely to have a cop present.

Third, the alert screen 430 shows the vehicles current speed of "48 mph". In some embodiments, the alert screen 430 may also show the applicable speed limit for comparison by the user. In some embodiments, the alert level and/or the warning outputs may be modified based upon the current vehicle speed and the applicable speed limit. For example, if the speed limit is 50 mph, the background of the alert may be green to indicate that the current driving speed is within the speed limit. For another example, if the speed limit is 25 mph, the background may be a bright red and the display 404 may flash. One skilled in the art will recognize that the colors and visual effects described herein are for illustrative purposes and do not limit the scope of the disclosure.

Finally, the alert screen 430 indicates the current distance of "100 Yards" to the predicted alert area. In some embodiments, the distance may be the distance between the vehicle and the edge of a general threat area. In other embodiments, the distance may represent the distance between the vehicle and a specific point of interest, such as a known speed camera location. The indicated distance may actively update as the vehicle approaches the designated area or point of interest. The initial distance for providing a warning may be determined based upon an evaluation of the current driving characteristics and location in light of the alert type and level. In some embodiments, the initial distance for providing a warning may be designated by user settings of the alert system During operation, the predicted alert and information is provided to the vehicle camera 402 from one or more other components of the vehicle camera system. For example, a mobile communication device paired with the vehicle camera 402 may run an alert program in conjunction with a remote server to identify relevant predicted alerts. The mobile communication device will monitor the current location of the vehicle and provide the current location to the server. When the current location and heading correspond with a predicted alert for an approaching geographic area, the server may transmit the predicted alert level, the alert type and alert location to the mobile communication device. Concurrently, the mobile communication device is determining or collecting vehicle speed information. When the predicted alert and information is received from the server, the mobile communication device determines a distance to the predicted alert location and transmits the predicted alert, the current speed information and the distance to the vehicle camera 402 which displays the alert to the user. When the alert is received by the vehicle camera 402, the vehicle camera may also flag the current video clip and additional clips relating to the predicted alert. In addition, the vehicle camera 402 may also embed additional information—such as the alert, the current speed, the current location, current heading and other information—into the video recording in some embodiments. Alternatively, the additional information may be saved concurrent with the relevant video clips.

In addition to the alert screen 430, the display 404 also shows an operation bar 432. Similar to the operation bar 422 discussed above, operation bar 432 provides icons representative of certain operations associated with the corresponding buttons 408, 412 and 414. Notably, the operation bar 432 does not include an icon corresponding to button 410 in this embodiment. The icons shown in this embodiment represent options relating to the threat alert. The icon corresponding to button 408 represents the option to dismiss the alert. In some embodiments, actuating button 408 will dismiss the alert from all of the connected components within the vehicle camera system. For example, pressing the button 408 turns off the alert displayed on the vehicle camera 402 and sends a signal to the paired mobile communication device and the paired radar detector to turn off the alert outputs from each device. In some embodiments, actuating button 408 may only turn off the alert outputs from vehicle camera 402 allowing the display 404 to return to a different operation screen—such as that shown in FIG. 4. In yet other embodiments, the button 408 may be actuated multiple times wherein the number of actuations determines whether the alert or a specific output indicating the alert is dismissed from the vehicle camera 402 and/or other components.

The icon corresponding to button 412 may allow the user to confirm that the predicted alert is accurate. For example, the user may actuate the button 412 upon seeing the speed camera device on the side of the road to confirm that the alert is correct. Upon an actuation of the button 412, the vehicle camera 402 may send a confirmation signal to the server in order to support the predicted alert. In addition, the vehicle camera 402 may also transmit a corresponding video file associated with the actuation of the button 412 to the server. The server may then perform optical recognition on the video clip to verify the existence of a threat. If the threat source is identified, the server may confirm the user's accuracy in providing the confirmation. In addition to updating the prediction (if needed), the server may update a profile associated with the user to indicate whether the user's confirmation was accurate. Such information may be used to create a credibility profile for each user which may be considered during analysis in the server to evaluate the probability of an alert.

In this embodiment, the icon shown is a representation of a radar/laser gun which corresponds to the threat type indicated in the alert screen 430. Similarly, the icon may change to correspond with different threat types indicated in the alert screen 430. An alternative icon that does not necessarily correspond with the threat type may be used to represent the confirmation in some embodiments The icon corresponding to button 414 may allow the user to indicate that the predicted alert is false. For example, the user may actuate the button 414 when it is apparent to the user that a threat is not present at the location. Upon an actuation of the button 414, the vehicle camera 402 may send a false alert signal to the server indicating the false alert user indication. In addition, the vehicle camera 402 may also transmit a corresponding video file associated with the actuation of the button 414 to the server. The server may then perform optical recognition on the video clip to verify the lack of a threat at the location. If the false alert indication appears accurate from the video clip, the server may confirm the user's accuracy in providing the false alert indication. In addition to updating the prediction (if needed), the server may update a profile associated with the user to indicate whether the user's confirmation was accurate.

In some embodiments, the server may use the video clips in conjunction with the user indications to modify the alert prediction in the server. In some embodiments, the false alert verification through optical recognition may be given less weight in an analysis by the data processor than a threat confirmation verified through optical recognition. This difference is consistent with the results of the verification because confirming a threat exists provides strong support for an alert while the inverse determination is only that a threat was not identified in the view provided by the video recording, but a threat may exist off camera.

FIG. 6 shows another back view of vehicle camera 402 with an alternative visual output shown on display 404. In this embodiment, the display 404 is showing an alert icon 440 in the video view screen 420. In this embodiment, the alert icon 440 is applied to the video view screen 420 on top of the current video feed for vehicle camera 402. In some embodiments, the alert icon 440 is overlaid upon the video view screen 420 at a default location.

In some embodiments, the alert icon 440 is applied to the anticipated location of the predicted alert. For example, the alert icon 440 is shown in FIG. 6 within a bubble pointing to an anticipated location for the predicted alert. In such embodiments, the vehicle camera system may utilize multiple components to determine the geographic points shown in the active video feed and correlate the alert icon 440 to the accurate geographic location anticipated for the predicted alert. For example, the current video feed may be sent from the vehicle camera 402 to the mobile communication device for evaluation. The mobile communication device may calculate the current position using internal location components and determine the geographic locations in the video feed using the current location of the mobile communication device, the scale of the video, the angle of the video feed, the speed of the vehicle and/or additional information, such as navigation reference points provided by a navigation system. Once the geographic locations in the video feed are determined, the mobile communication device may use the geographic location associated with the predicted alert to identify the position of the alert icon 440 in the video feed and the video view screen 420. The mobile communication device may send the alert icon 440 with a position in the video view screen 420 to display the alert icon 440 corresponding to the anticipate location of the predicted alert. The mobile communication device may provide updates to the position of the alert icon 440 as the vehicle continues travel. The application of alert icon 440 may be conducted using other processes and/or components in some embodiments.

As shown, the alert icon 440 indicates a predicted threat approaching. The specific alert icon 440 shows a radar/laser gun indicating a radar/laser monitored site. Similar to the alert screen 430 discussed above, the visual effects, coloring and/or icon design may change to indicate the predicted alert level, the type of alert or notice, the current calculated risk for the driver based upon the current driving characteristics (e.g. comparing current speed to the known speed limit at the threat location) and/or other information relating to the alert. In addition, the alert icon 440 may actively flash between multiple icons indicating different predicted alerts approaching. In some embodiments, additional information may also be overlaid on the video view screen 420 relating to the predicted alert or current driving activity.

During operation, the predicted alert and information may be provided to the vehicle camera 402 from one or more other components of the vehicle camera system. For example, a radar detector paired with the vehicle camera 402 may run an alert program in conjunction with a remote server to identify relevant predicted alerts. The radar detector may receive the current location and heading of the vehicle from a navigation unit and provide the current location to the server. When the current location and heading corresponds with a predicted alert for an approaching geographic area, the server may transmit the predicted alert level, the alert type and alert location to the radar detector. When the predicted alert and information is received from the server, the radar detector transmits the predicted alert to the vehicle camera 402 which displays the alert to the user. When the alert is received by the vehicle camera 402, the vehicle camera may also flag the current video clip and additional clips relating to the predicted alert. In addition, the vehicle camera 402 may also embed additional information provided to the vehicle camera 402—such as the alert, the current speed, the current location and other information—into the video recording in some embodiments. Alternatively, the additional information may be saved concurrent with the relevant video clips.

In addition to the alert icon 440 shown on the video view screen 420, the display 404 also shows the information bar 424 and the operation bar 432 discussed further above. As discussed above, the information bar 424 provides status information and the operation bar 432 provides options of the user relating to the threat alert indicated in the alert icon 440. Similarly, in some embodiments, the display 404 may include touch screen options for the user interface components instead of or in addition to the buttons 408-414. In such an embodiment, the alert icon 440 may also be linked with different information that is accessible using the touch screen functionality. For example, touching the display 404 at the location of the alert icon 440 may initiate a voice warning to provide the user details of the predicted alert. For another example, touching the display 404 at the location of the alert icon 440 may cause the display 404 to show a threat alert screen with more detail such as the alert screen 430 shown in FIG. 5.

Figure 7:
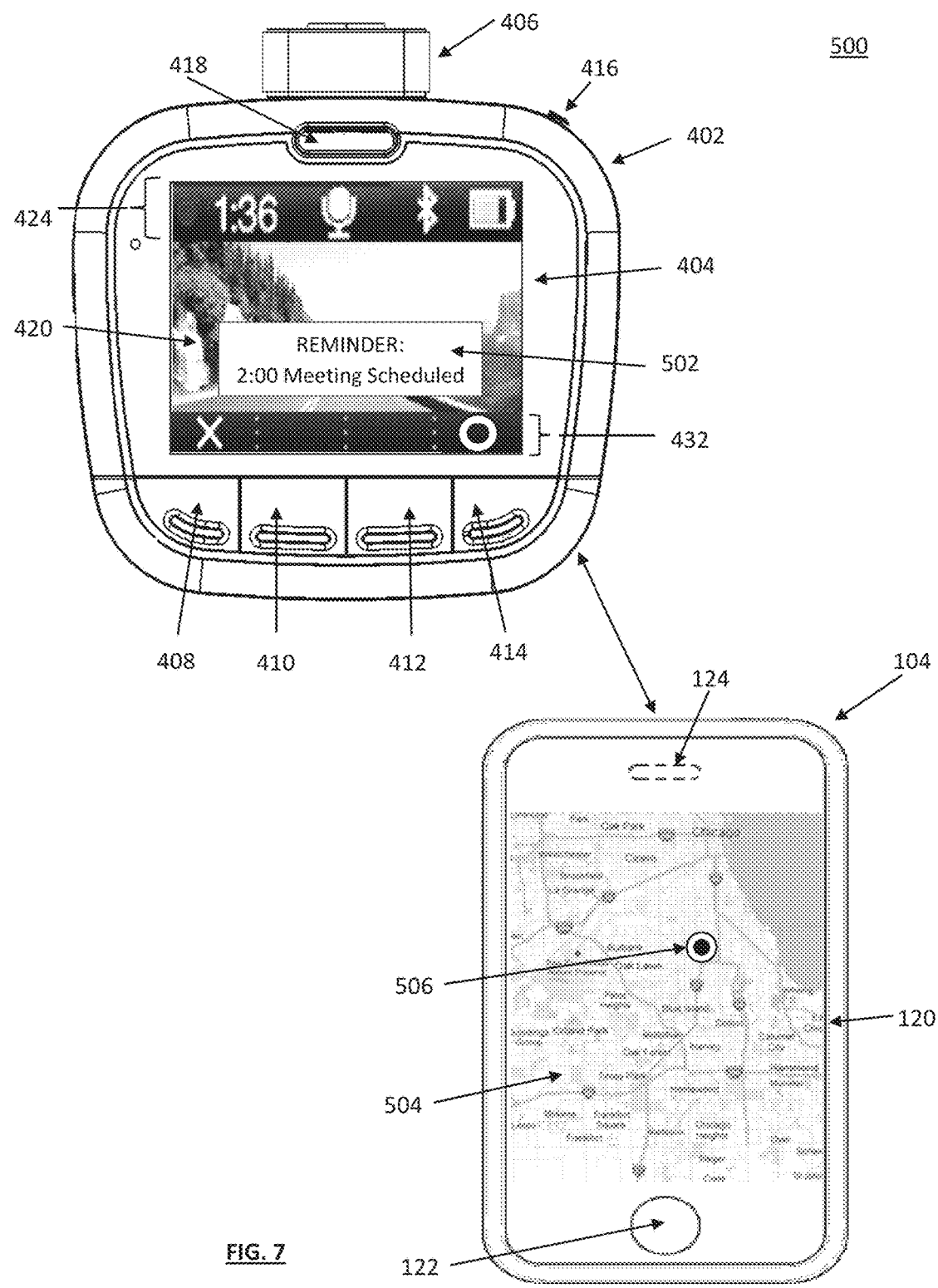
FIG. 7 is an embodiment of the present disclosure showing a vehicle camera depicting a reminder and interfacing with a smart phone depicting a map.

FIG. 7 illustrates a vehicle camera system 500 including the vehicle camera 402 and the mobile communication device 104, each discussed above. The vehicle camera 402 and the mobile communication device 104 are connected using a short-range communication standard in this embodiment to provide an active exchange of information. In this embodiment, the vehicle camera 402 includes notice 502 over the video view screen 420. For illustration, the notice 502 shows a meeting reminder. The notice 502 may operate to provide any notice available to the video camera system 500.

The meeting reminder may be maintained in a calendar or scheduling feature in the mobile communication device 104. When paired with the vehicle camera 402, the mobile communication device 104 may automatically transmit reminders, notices or other display outputs to the vehicle camera 402 through a paired communication with the vehicle camera 402. This operation may be a default setting for the vehicle camera system 500 or a user selected setting.

In some embodiments, once the reminder is transmitted to the vehicle camera 402, the notice 502 appears on the display 404 over the video view screen 420 and the operation bar 432 is displayed. In this embodiment, the operation bar 432 includes a dismiss icon corresponding to button 408 and a location option corresponding to button 414. If the button 408 is pressed in some embodiments, the notice 502 may be removed from the video view screen 420 only and remain on any other output associated with the reminder, such as the screen 120 of the mobile communication device 104. In some embodiments, the dismissal will apply to all of the components in the vehicle camera system 500 and may apply to remote devices associated with the reminder, such as an office computer. In some embodiments, the dismiss option will operate as a postpone command, whereby the reminder will reoccur based upon another trigger. For example, the reminder may reappear 10 minutes before the meeting. In some embodiments, the postpone option may be presented as a separate icon in operation bar 432. Alternatively, the video camera 402 may treat one actuation of the button 408 as postponing the reminder while actuating the button 408 multiple times dismisses the reminder.

In this embodiment, pressing the button 414 will initiate a navigation feature in the mobile communication device 104 to illustrate the location of the scheduled meeting. In some embodiments, the navigation feature may further provide directions to the location of the meeting. In some embodiments, the vehicle camera system 500 may include another component with a navigation feature that may be initiated based upon the actuation of button 414 on the vehicle camera 402.

If a location and/or address is not associated with the reminder, the icon corresponding to button 414 may be omitted or replaced with an alternative icon. For example, the icon may be replaced with an icon indicating the option for the user to initiate a voice control option to verbally input the location for the meeting and trigger the associated navigation feature of the mobile communication device 104. In such an embodiment, the verbal input may be received by a microphone in the vehicle camera 402 and/or in a microphone in the mobile communication device 104.

In this embodiment, the mobile communication device 104 shows a map 504 on the display 120. A location point 506 is located on the map 504 to indicate the location of the scheduled meeting indicated in notice 502 on the vehicle camera 402. A direction layout may also be applied to the map 504 illustrating the directions from the current location of the vehicle to the location point 506 associated with the meeting location. Additional direction and travel information, including travel instructions, estimated time to the location point 506, traffic warnings and other information may be provided to the user via the mobile communication device 104, the vehicle camera 402 and/or another connected component in the vehicle.

During operation, information is actively exchanged within the vehicle camera system 500 to facilitate operations of the components in the vehicle camera system 500, including the vehicle camera 402 and the mobile communication device 104. In the embodiment shown, a feature of the mobile communication device 104 triggers a scheduled meeting reminder. The mobile communication device 104 packages the information for the meeting reminder and transmits the instructions to the vehicle camera 402 to display the notice 502. When packaging the information for transmission, the mobile communication device 104 may provide only the appropriate information for the notice 502 and to indicate the appropriate icons for operation bar 432. For example, the package may include a reminder flag to indicate the type of transmission, the output "REMINDER: 2:00 Meeting Scheduled", and location flag to indicate that there is an address associated with the reminder in the mobile communication device 104. Limiting the information provided to the vehicle camera 402 may increase the efficiency of the transmission and processing in the vehicle camera 402.

Once the vehicle camera 402 receives the reminder package from the mobile communication device 104, the vehicle camera 402 displays the notice 502 and the modified operation bar 432 for the user. Concurrently, the mobile communication device 104, the vehicle camera 402 and/or another connected vehicle component may provide an audible notice to the user indicating the reminder. The user may then actuate button 408 or button 414 based upon the received reminder. If the user selects the button 414, the vehicle camera 402 transmits a signal to the mobile communication device 104 to initiate the navigation feature. The mobile communication device 104 uses the location provided in the original reminder feature of the mobile communication device 104 to determine and display the map 504 and the location point 506.

The user interface components of the vehicle camera 402 and mobile communication device 104 may also be utilized to provide additional instructions and options relating to the meeting reminder and/or the navigation feature. For example, after initiating the navigation feature, the vehicle camera 402 may show a directions icon option in the operation bar 432 to allow the user to initiate the directions option in the navigation feature.

In some embodiments, the vehicle camera system 500 may be implemented to facilitate other system options consistent with the connected components of the vehicle camera system 500. For example, the vehicle camera system 500 may facilitate a conference call reminder wherein the vehicle camera 402 provides the reminder in notice 502 and the operations bar 432 shows an icon, such as a phone, to allow the user to initiate the scheduled conference call over mobile communication device 104. In some embodiments, the vehicle camera system 500 may also utilize the microphone and/or speaker of the vehicle camera 402 to facilitate the conference call. In some embodiments, the vehicle camera system 500 is operable to prioritize the microphone and speakers of the connected components to use in facilitating the conference call based upon the best acoustic qualities for the call. In such an embodiment, the vehicle camera system 500 may utilize the microphone in the vehicle camera 402 and the speaker system of the vehicle and/or any other combination of available components.

Figure 8:
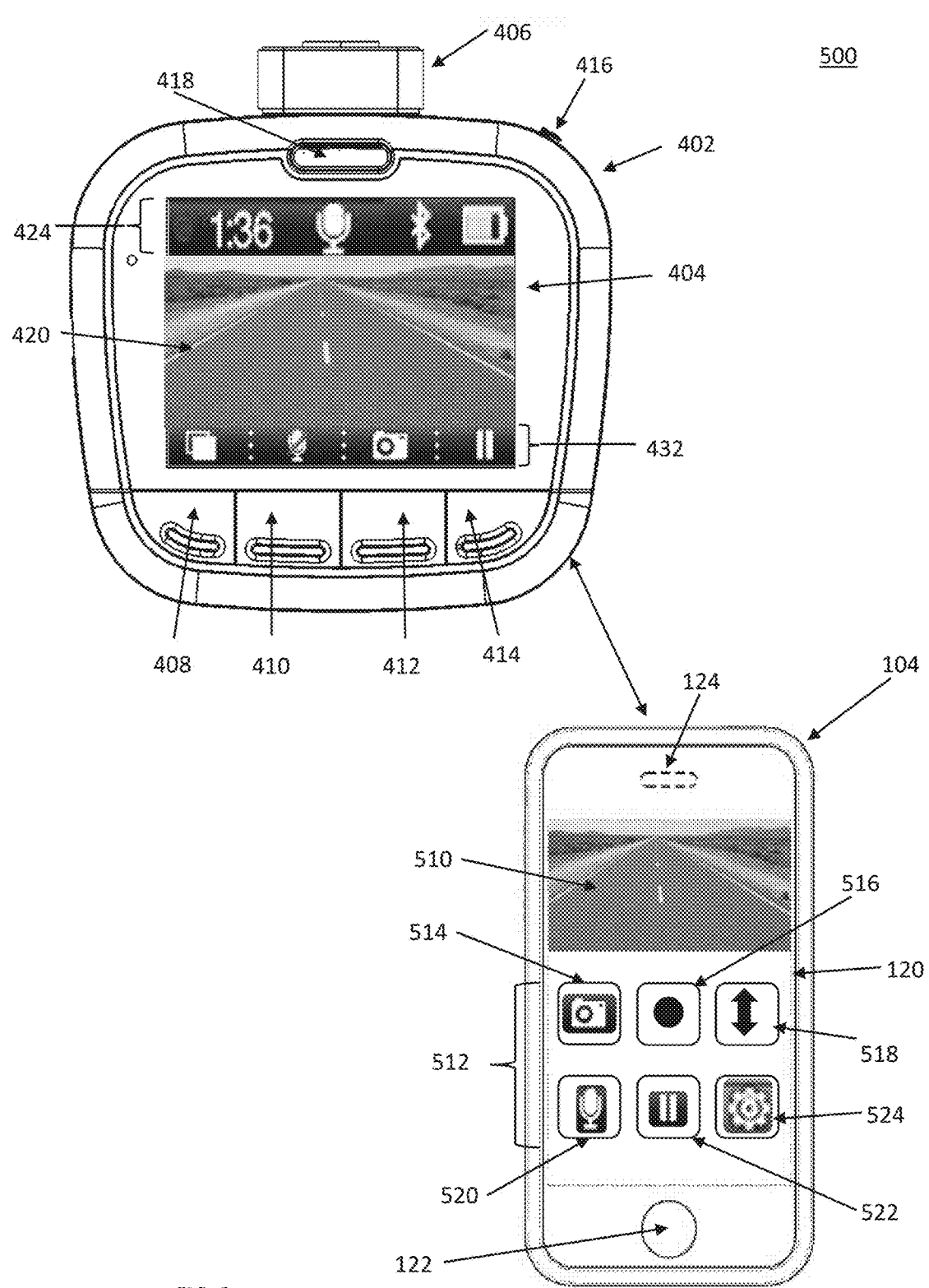
FIG. 8 is an embodiment of the present disclosure showing a vehicle camera depicting a video feed and interfacing with a smart phone depicting the video feed and a user interface.

FIG. 8 shows another embodiment of the vehicle camera system 500. In this embodiment, the vehicle camera 402 shown is the same as the vehicle camera 402 shown in FIG. 4 and described above. The mobile communication device 104 in this embodiment, illustrates the display 120 with partitioned sections. Specifically, the top of display 120 shows a video view screen 510 showing the current video feed from the vehicle camera 402. In this embodiment, the video view screen 510 is showing the same view as that shown in the video view screen 420 on the vehicle camera 402. In some embodiments, engaging the video view screen 510 on the mobile communication device 104 will initiate an instruction to turn off video view screen 420 or modify the video view screen 420 on the vehicle camera 402. In some embodiments having multiple vehicle cameras 402, the video view screen 510 may display a current video feed from any of the connected vehicle cameras 402. In some embodiments, the video view screen 510 may show a delayed video feed from the vehicle camera 402 and/or operate to provide a playback of a stored video clip.

In this embodiment, the display 120 also shows a control screen 512 including touch screen controls 514-524 to manage features of the vehicle camera system 500. One skilled in the art will recognize that the controls 514-524 shown in this control screen 512 are illustrative and the control screen 512 and the controls 514-524 may be modified in other embodiments and remain within the spirit and scope of the disclosure. In some embodiments, the vehicle camera 402 may automatically change modes of operation based upon a connection to the mobile communication device 104. For example, the vehicle camera 402 may display an indicator representing the detected presence of the mobile communication device 104 and default to the use of settings and controls provided by the mobile communication device 104. For another example, the vehicle camera 402 may automatically send video feeds to the mobile communication device 104 for display, storage, processing and/or other operations and the vehicle camera 402 may use an internal buffer to collect and send the video feed without using the looping process on the camera memory. In such a design, all video clips may be automatically deleted once they are transmitted to the mobile communication device 104. In some embodiments, the image files or other video clips are automatically deleted from the memory of the vehicle camera 402 when they are transmitted to another device from the vehicle camera 402.

In this embodiment, the touch screen controls include a snapshot button 514, a record button 516, an invert button 518, a microphone button 520, a pause button 522 and a settings button 524. The snapshot button 514 may operate to take a still image from the video recording image shown in video view screen 510. In some embodiments, the record button 516 may operate to control the recording of the video shown in video view screen 510. For example, the video feed shown in video view screen 510 may be stored in a looping section of memory that will be overwritten. When the record button 516 is active, the video feed will be saved (or moved) to a non-looping section of memory and will not be overwritten. In some embodiments, the record button 516 will also operate as a pause or stop button to stop the active recording. In such an embodiment, the icon in 516 may toggle between options depending on the current status of the button 516.

In some embodiments, the invert button 518 may operate to invert the visual output shown in sections of the display 404 on the vehicle camera 402. As discussed above, inverting output on the display 404 may include rearranging the layout of the sections shown to maintain the corresponding relationship between icons in the operation bar and the buttons 408-414. In some embodiments, the invert button 518 may invert the video feed shown in the video view screen 510.

The microphone button 520 may operate to select which microphone in the vehicle camera system 500 will be used to record audio in conjunction with the video feed. In some embodiments, the microphone button 520 may be operable to mute and/or activate the microphone of the vehicle camera 402. In some embodiments, the microphone button 520 may operate as a post processing control to modify the audio associated with the video recording shown in video view screen 510. For example, during a review of a video recording in video view screen 510 the user presses microphone button 520 to remove the audio of a private conversation from the recording.

In the embodiment shown, the pause button 522 is operable to pause the current recording. In some embodiments, the pause button 522 is designed to pause the video feed shown in the video view screen 510. In embodiments facilitating playback of video clips, the pause button 522 may toggle between a pause and play icon to allow a user to stop and start the video playback.

The settings button 524 is operable to open a screen, window or other view facilitating control of customizable settings for the vehicle camera 402, the vehicle camera system 500, features in the mobile communication device 104 and/or one or more additional connected components. For example, the settings button 524 may open a control page to establish settings for communicating predicted alerts, notices and other information to a user via one or more connected in-vehicle components. For another example, the settings page may allow the user to modify position of the vehicle camera 402 using electromechanical elements to rotate the vehicle camera 402, adjust the vertical angle of the vehicle camera 402 and/or otherwise change the camera view. For yet another example, the settings page opened using the settings button 524 may allow a user to control the information exchanged between components, such as geographic locations, current time for the location, vehicle characteristics and other information.

In some embodiments, a user's preferred settings for vehicle camera 402 are stored in the mobile communication device 104. When the mobile communication device 104 initiates communication with the vehicle camera 402, the vehicle camera 402 applies the settings provided by the mobile communication device 104. In such embodiments, the mobile communication device 104 may operate to provide the user's preferred settings to additional vehicle cameras 402. For example, a user may pair the mobile communication device 104 to set up a new vehicle camera 402 with the user's preferred settings. For another example, the user may use multiple vehicles with separate vehicle cameras 402, and each vehicle camera 402 will apply the user's settings when the user's mobile communication device 104 pairs with the vehicle camera 402 in the specific vehicle. In addition, embodiments of the vehicle camera 402 may be pair with different mobile communication devices 104 and adapt the user preferences associated with the currently paired mobile communication device 104. In some embodiments, a user's preferred settings for vehicle camera 402 are maintained as part of an account associated with the user. When a vehicle camera 402 is associated with a user account, the vehicle camera 402 may adopt the user's preferred settings provided in the user account. In some embodiments, the user account may be associated with the vehicle camera 402 through a user's mobile communication device 104. In some embodiments, the settings for multiple components in a vehicle camera system 500 will adopt the settings stored on the mobile communication device 104 and/or a user account similar to the vehicle camera 402 discussed above. For example, an electromagnetic signal detector and a vehicle information system may adopt the settings provided in the mobile communication device 104.

In some embodiments, the settings button 524 facilitates the display of current settings associated with the operation of the vehicle camera 402. For example, touching the settings button 524 may open a page showing the settings of vehicle camera 402, such as light settings, motion settings, filter settings and other settings. In some embodiments, the vehicle camera system 500 operates to automatically adjust the settings of the vehicle camera 402. For example, the motion settings of the vehicle camera 402 may be automatically controlled based upon the current speed of the vehicle. For another example, the light settings, such as daytime, night time, sunrise, sunset and other light settings, may be automatically controlled based upon a current time and date for the current location of the vehicle camera 402 and the current weather at the location of the vehicle camera 402. For yet another example, the current light settings may be based upon the vehicle heading and light sensors associated with the vehicle's lighting controls. Filter settings may also be based upon navigation feature information to evaluate anticipated scenery types.

In some embodiments, the control screen 512 may include one or more buttons to facilitate editing of a video recording. Embodiments of the vehicle camera 402 may also include editing options. In some embodiments, editing a video recording allows a user to shorten, compress and/or otherwise decrease the size of a video recording to improve the efficiency of transferring the video recording. In some embodiments, the editing option will allow a user to limit the video to specific images of interest for sharing and/or further review and analysis.

In some embodiments, another mobile communication device 104 may be remotely located and receive the video feed from another vehicle camera system. For example, a parent may set the vehicle camera 402 to transmit the video feed in real-time to a remote server wherein the video feed is available to a remote device to monitor a child's driving. In some embodiments, the system is designed to allow a remote user with system administrator rights to assume control of the vehicle camera 402, including the operation controls such as those shown in the control screen 512. For example, an owner of the vehicle may remotely assume control of the camera when the vehicle is missing to initiate a video recording and collection of relevant driving data. In some embodiments, the controls and the mounting components of the vehicle camera 402 may further allow the remote user to rotate the vehicle camera 402 to capture additional images, such as a recording of the driver.

Figure 9:
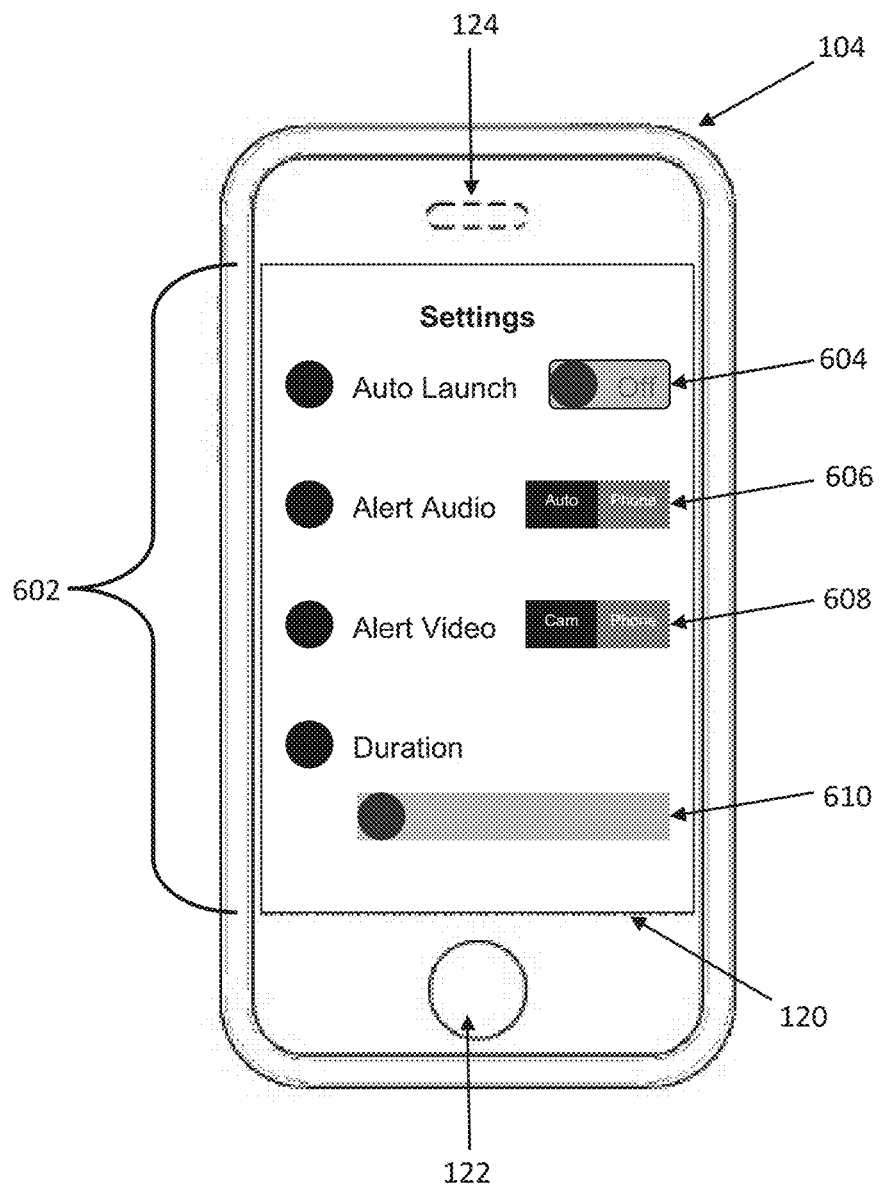
FIG. 9 is an embodiment of a smart phone depicting a user interface screen.

FIG. 9 depicts mobile communication device 104 showing an illustrative settings page allowing the user of mobile communication device 104 to control the settings of the vehicle camera system. One skilled in the art will recognize that the illustrative setting options shown in settings screen 602 may be modified in other embodiments and remain within the spirit and scope of the disclosure. In this embodiment, the settings screen 602 includes an automatic launch control 604, an alert audio control 606, an alert video control 608, and a duration control 610.

In this embodiment, the automatic launch control 604 is a touch-screen button which shows the current selection in the view of a toggle switch. For example, as shown the automatic launch feature of the application is "off". If the automatic launch control 604 is touched, the automatic launch control 604 may shift the depicted circular portion to the right and indicate the feature is "on". One skilled in the art will recognize that the user interface options for controlling the operation of the application features of the vehicle camera system may vary and remain within the scope and spirit of the disclosure. The automatic launch feature may be designed to initiate execution of an application and/or engagement of a component associated with the vehicle camera system based upon a triggering event. In some embodiments, the triggering event may include entering the operative range of another component of the systems (e.g. a vehicle camera, an electromagnetic signal detector, a vehicle, a navigation unit, etc.), a detected vehicle operation (e.g. a threshold speed, sudden change in acceleration, etc.), entering a location associated with a specified notice, alert type or threshold alert level, a change in the vehicle camera view (e.g. a person enters the camera view, the vehicle moves changing the camera view, etc.) and/or other triggering events.

In some embodiments, the automatic launch feature applies to launching the entire application and/or corresponding applications and equipment in other operatively associated applications and/or components of the vehicle camera system disclosed herein. In some embodiments, the automatic launch feature may apply to any one or more portions of the application and/or corresponding applications and equipment in other operatively associated applications and/or components of the vehicle camera system disclosed herein. In such embodiments, when automatic launch control 604 is "on", additional detailed automatic launch controls may be provided for selecting which aspects of the system will be automatically launched. For example, the mobile communication device 104 may be associated with a car diagnostic system which may be automatically launched to record car diagnostics upon a sudden change in acceleration meeting a set threshold. In addition, the mobile communication device 104 may receive the corresponding video clip associated with the sudden change in acceleration and embed the car diagnostic information into the video file. In some embodiments, the display of user controls and selections may vary and remain within the scope and spirit of the disclosure.

The alert audio control 606 and the alert video control 608 are shown in this embodiment as touch-screen buttons which display the options for selection and highlight the current selection for the user. In the embodiment shown, the alert audio control 606 allows a user to set the vehicle camera system to provide the audio output through the automobile and/or the phone (i.e. the mobile communication device 104 in this embodiment). The alert video control 608 allows a user to set the vehicle camera system to provide the video output through the vehicle camera and/or the phone (i.e. the mobile communication device 104) in this embodiment.

In some embodiments, the alert audio control 606 and/or the alert video control 608 may comprise two or more buttons, wherein each button is associated with a selectable option. In such embodiments, the application may limit the selection to one option (i.e. the last option selected) or may allow for multiple concurrent selections. For example, a user of mobile communication device 104 may use alert audio control 606 to select both auto and phone causing any audio alerts to be provided over both the vehicle speakers and the speaker 124. In some embodiments, the control may expand to include additional optional components having audible outputs, such as a vehicle camera, an electromagnetic signal detector and/or another component. In some embodiments, the alert audio control 606 and/or the alert video control 608 may comprise a button which depicts only the current setting, and provides a different indication of a selected setting each time the control 606 or 608 is toggled. In some embodiments, the selection in one control may determine and/or limit the options provided by another control.

In this embodiment, the duration control 610 is shown as a slide control to allow the user to adjust the duration of the alert. In some embodiments, alternative duration controls may work in conjunction with or instead of duration control 610. For example, the duration control 610 may establish a default duration for an alert and another control may allow the user to modify the default duration based upon the predicted alert level.

Figure 10:
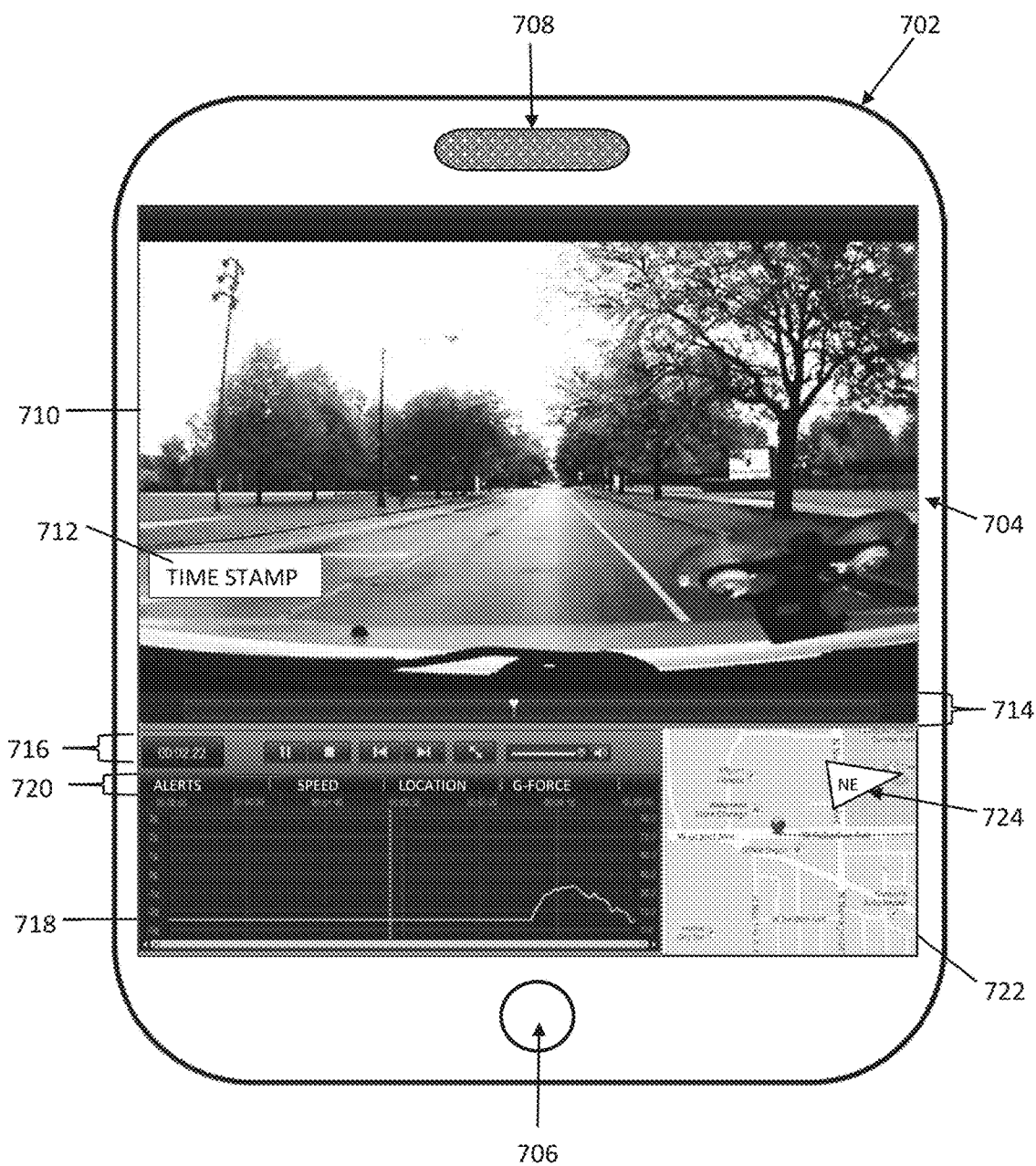
FIG. 10 is an embodiment of a tablet depicting an embodiment of a recording playback screen of the present disclosure.

FIG. 10 depicts a mobile communication device as a tablet 702. In this embodiment, the tablet 702 includes a display 704, a button 706 and a speaker 708 shown in this view. The tablet may also include a microphone, a camera, input/output ports, user controls and/or other elements. In some embodiments, the tablet 702 may include alternative controls and/or elements instead of or in addition to those shown in FIG. 10. Some embodiments of the tablet 702 may include multiple displays 704, buttons 706, speakers 708 and/or other elements.

In this embodiment, the output shown on the display 704 is a video playback output which shows additional information correlated with the recorded video clip. As discussed above, the vehicle camera system may identify a variety of information and correlate the information with a concurrently recorded video. The information may be derived from one or more components in the vehicle camera system and stored in conjunction with a saved video file. In some embodiments, the additional data is embedded in the video recording. In this embodiment, the output on the display 704 is partitioned to show the different information in conjunction with the video. The partitioned sections in this embodiment include a video screen 710, a scroll bar 714, a control bar 716, an information screen 718, an information bar 720 and a map 722.

In this embodiment, the video screen 710 is showing a video feed from a dash camera in a vehicle. In some embodiments, the video screen 710 may be partitioned to show multiple camera feeds simultaneously. The additional camera feeds may be from the same vehicle and/or from other cameras. For example, the video screen 710 may show video from a dash camera and a cabin camera from one vehicle, a vehicle camera from another vehicle and a storefront camera. Each of the camera feeds may be correlated to provide a synchronous view from multiple angles. In some embodiments, the data processor associated with the server synchronizes the video feeds.

The video screen 710 includes a time stamp 712. The time stamp 712 may be embedded in the video recording at a default location, such as the lower left side shown. Alternatively, the time stamp 712 may be embedded in the video recording as an optional piece of information for display. In such embodiments, the settings of the playback application, whether default or user selected, may define whether the time stamp 712 is shown and where the time stamp is shown in the video screen 710. In some embodiments, the playback application may automatically determine the placement of the time stamp 712 based upon an analysis of the video.

In the vehicle camera system, the time provided for time stamp 712 may be derived from the mobile communication device in the vehicle and/or another device operable to determine the present location of the vehicle and correlate the accurate time applicable to the specific location based upon a time zone analysis. In addition, the device may confirm that daylight savings (if applicable) and/or other time-shifting considerations are considered to determine the correct time. The mobile communication device may provide the accurate time to the vehicle camera and other connected components. The components may utilize the time provided by the mobile communication device in order to sync the information from multiple devices when combined in a single video recording.

In this embodiment, the scroll bar 714 provides a representation of the current point in the recording relative to the entire length of the recording. As the video plays, the indicator in the scroll bar 714 will continue to move along the scroll bar 714 in this embodiment. In some embodiments including a touch screen control option, the user may slide the indicator along the scroll bar 714 to change the point in the video shown in the video screen 710.

In this embodiment, the control bar 716 provides options for controlling the recording play back. The control bar 716 includes a current time view showing the time associated with the current point in the recording which may be used to select a given time within the recording. For example, a user may press the current time to open a pop-up allowing the user to enter a new time. When the time is confirmed, the recording playback will jump the selected time. The control bar 716 in this embodiment also includes controls to pause, stop and play the recording. In some embodiments, the skip buttons shown may operate to jump forward and backward to specific points flagged in the recording. For example, the vehicle camera system may place flags in a video at points when an alert is received from the mobile communication device, the vehicle abruptly decelerates, a user alert confirmation is received, the vehicle reaccelerates and/or a spike in the audio. In some embodiments, the skip buttons operate to jump by a set amount of time, such as 15 second intervals. In some embodiments, the skip buttons operate to jump to the next clip in a series of video clips. The control bar 716 also shows volume control options for the video playback and the option to maximize the video screen in this embodiment. In some embodiments, the options provided in the control bar 716 may vary and alternative controls may be included.

The information screen 718 shown in this embodiment includes a graph illustration showing the vehicle speed along the length of the video with a cursor indicating the point along the graph corresponding to the video showing in video screen 710. In some embodiments, additional information may also be provided in the same graph. For example, the information screen 718 may show multiple concurrent graphs regarding different vehicle information, such as the G-Force of the vehicle, and other related information, such as predicted alert levels, weather information, audio information and other information. In some embodiments, the information screen 718 may illustrate data in other formats than the graph shown. For example, the information screen 718 may include a series of display sections that digitally provide the data corresponding to the point in time of the video showing in video screen 710. The information screen

718 may show a speed, a G-Force, a location, an alert indicator, a heading and/or other information.

In this embodiment, the information bar 720 identifies relevant information regarding the vehicle travel shown in the video screen 710. One skilled in the art will recognize that the categories provided are illustrative and do not limit scope of the disclosure. In some embodiments, the data illustrated on the information screen 718 may be selected from the options identified in the information bar 720. In some embodiments, the data corresponding to each category identified in information bar 720 will be displayed adjacent to the category title. For example, the vehicle speed may be shown digitally next to the word "SPEED". In some embodiments, the information for each category will be displayed without the category name. For example, the word "LOCATION" may be replaced with a latitude and longitude corresponding to the location of the vehicle as shown in the video screen 710. In some embodiments, visual effects may be applied to one or more of the categories and/or backgrounds to provide information to the user. For example, the word "ALERTS" may change appearance based upon the current alert level associated with the location of the vehicle in the video. For another example, the background for the word "SPEED" may change color to indicate whether the vehicle is speeding in the video or within the appropriate speed limit. Each of the visual effects and output options may be controlled through one or more settings options. In addition, the threshold for certain information may be defined for controlling visual effects. For example, the user may set the speed indicator show a warning if the vehicle is traveling more than 4 MPH over the speed limit. For another example, the user may set the alert option to only activate when there is a high level alert and the vehicle is speeding.

This embodiment also includes the map 722 illustrating the location of the vehicle corresponding to the video play back. As the video plays, the vehicle location indicator will move along the map 722 in conjunction with the vehicle's path of travel. In some embodiments, the path of the vehicle may be illustrated on the map 722. The path illustration may indicate the path of travel for the entire video segment or a portion thereof. For example, the map 722 may only show the path remaining for the video segment. Alternatively, the map 722 may only show the path travelled up to the current point in the video segment. In some embodiments, the map 722 may illustrate a selected navigation path from a navigation component. In such cases, the map 722 may also illustrate the path taken by a vehicle. Comparisons of the selected navigation path and the actual navigation path may be analyzed by the server and reviewed by a system user. For example, a parent may review inconsistent travel paths and the corresponding videos. For another example, a company supervisor may review inconsistent travel paths of a company vehicle.

The current heading of the vehicle is also shown in a compass 724. The compass 724 may rotate to indicate the actual heading on the map 722 in some embodiments. In some embodiments, the compass 724 and/or heading may be shown in another section of the output of display 704. For example, the compass 724 may be shown in the video screen 710. In another example, the heading may be provided in the information bar 720.

In this embodiment, the video screen 710 and the map 722 are synced such that the dot on the map 722 corresponds with the location of the vehicle in the video shown in video screen 710. In some embodiments, the information screen 718 may also be synced with the video screen 710 and the map 722. In the synced embodiments, the controls operate to change the information output on each of the screens to maintain synchronization in the outputs. In some embodiments, the outputs are not in a locked synchronization and each screen may be independently manipulated. In such embodiments, secondary indicators, such as visual effects and audible effects, may indicate a time overlap in the different screens. For example, the user may set a flag for the information screen 718 to flash when the video shown in the video screen 710 reaches a selected change in speed.

Figure 11:
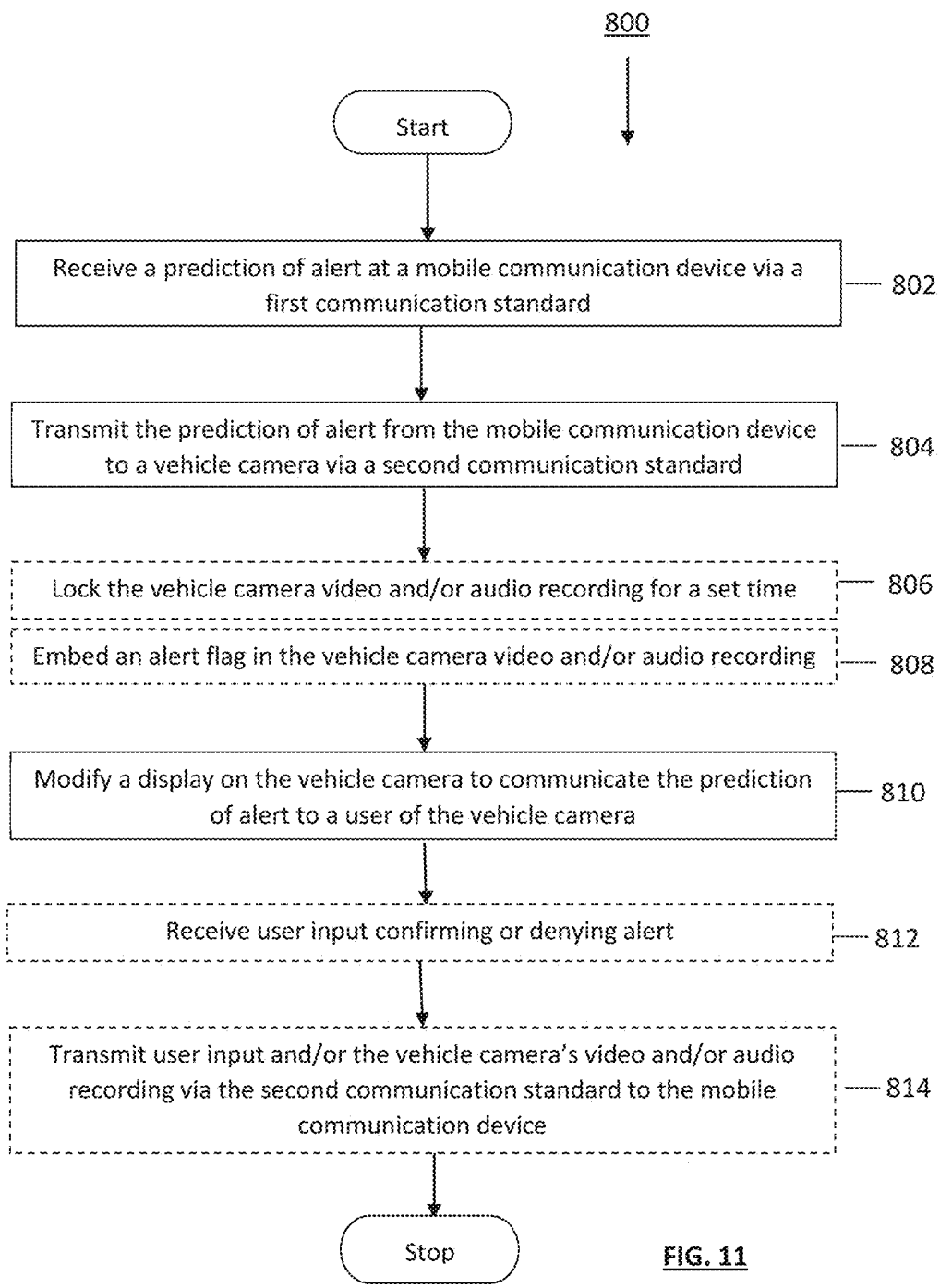
FIG. 11 is a flowchart depicting an embodiment of a process of the present disclosure.

FIG. 11 is a flowchart depicting an embodiment of process 800. The process 800 may be a method executed by the vehicle camera systems described above and/or a computer program product to provide predictions using the vehicle camera display of an in-vehicle camera system.

In box 802, a prediction of an alert is received by a mobile communication device via a first communication standard. For example, the mobile communication device receives data that indicates a predicted alert from a server over the cellular communication network.

In box 804, the mobile communication device transmits the prediction of the alert to a vehicle camera via a second communication standard. For example, the mobile communication device sends data regarding the alert prediction to the vehicle camera over the BLUETOOTH communication standard.

Boxes 806 and 808 illustrate optional steps, as indicated by the broken lines, in the process based upon the receipt of the predicted alert data by the vehicle camera. In box 806, the vehicle camera may automatically lock the applicable video and/or audio recording for a set amount of time. For example, the vehicle camera may lock the video and audio recordings covering the time from 15 seconds prior to the receipt of the predicted alert data through the next two (2) minutes. In some embodiments, the set amount of time may be established in a default setting for the vehicle camera system. Embodiments may facilitate user customization to set the amount of time for the recording information to be locked.

In box 808, the vehicle camera may automatically embed an alert flag in the applicable video and/or audio recording. For example, the vehicle camera may embed an alert flag into the recording file having the time of the alert. In some embodiments, the flag may be used for initiating an alert prediction analysis using optical recognition of the video by the data processor associated with the server. In some embodiments, the flag increases the efficiency for identifying applicable videos and/or dates for further processing or review in the event a review is warranted. For example, the user may pull the video recordings for analysis following the receipt of a speeding ticket in the area of the alert to determine if the driver was actually speeding at the time of the incident.

In box 810, the output provided on the vehicle camera display is modified to communicate the prediction of an alert to a user of the vehicle camera. For example, the vehicle camera may display an alert indicator in the vehicle camera display, such as the alerts shown in FIGS. 5 and 6. The display may also be modified using other visual effects to indicate an alert. For example, the alert may cause an alternate hue to be shown on the video in the display to indicate an alert level.

Boxes 812 and 814 illustrate optional steps, as indicated by the broken lines, in the process. In box 812, the vehicle camera receives a user input confirming or denying the alert. For example, a user may press a button on the vehicle camera confirming an alert that indicates a red light camera.

For another example, the vehicle camera microphone may receive a user's verbal statement the alert was false.

In box 814, the vehicle camera transmits the user input and/or the video and/or audio recording via the second communication standard to the mobile communication device. For example, the vehicle camera may send the user confirmation input and the video recording to the mobile communication device via the BLUETOOTH communication standard. In some embodiments, the mobile communication device may further process the information from the vehicle camera and/or send the information to a remote server for further processing.

Figure 12:
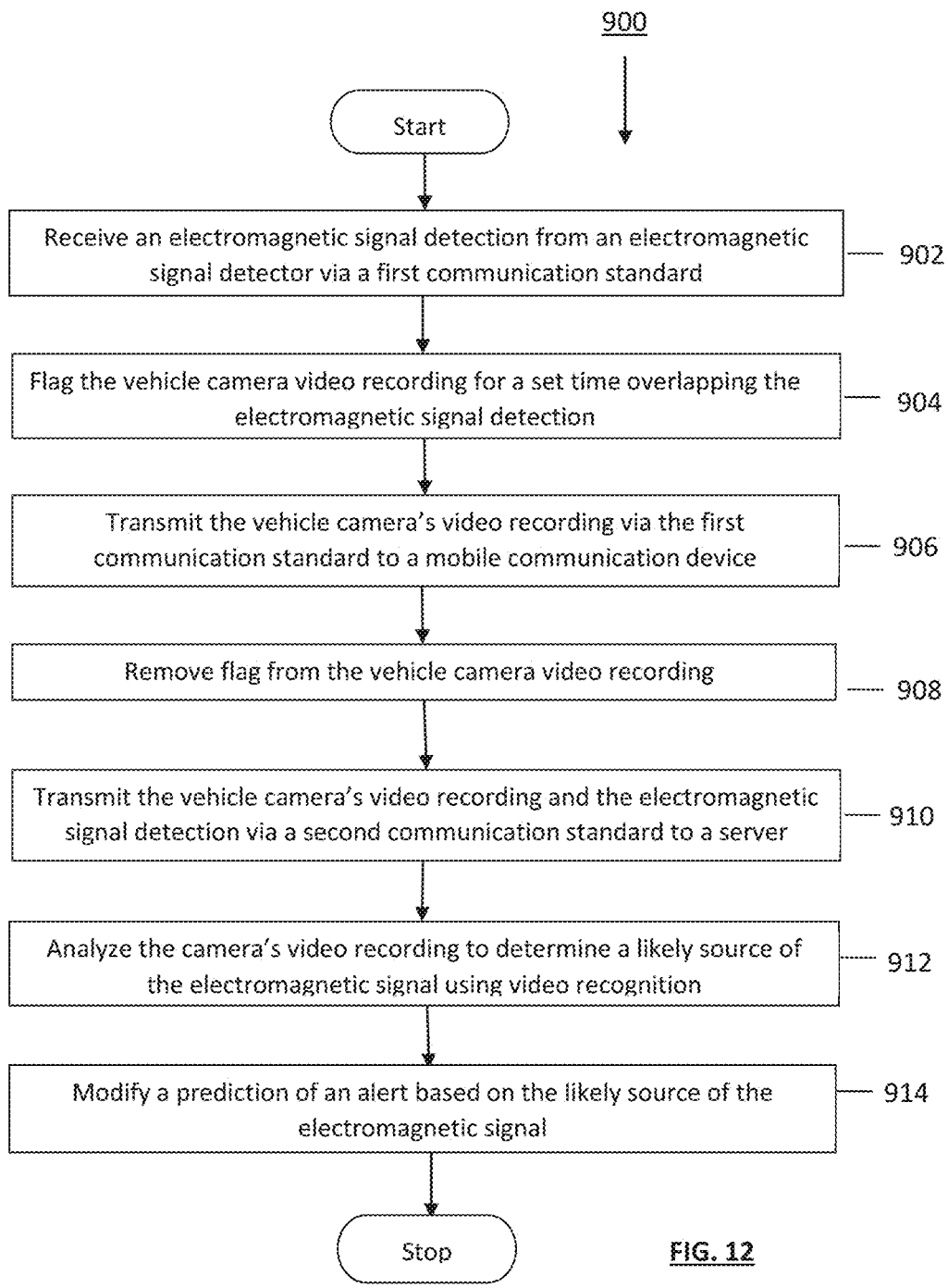
FIG. 12 is another flowchart depicting an embodiment of a process of the present disclosure.

FIG. 12 is a flowchart depicting an embodiment of process 900. The process 900 may be a method executed by the vehicle camera systems described above and/or a computer program product to facilitate alert prediction analysis using a vehicle camera system.

In box 902, an electromagnetic signal detection is received from an electromagnetic signal detector via a first communication standard. For example, the mobile communication device receives a radar signal detection from a radar detector over a ZIGBEE communication standard. For another example, the vehicle camera receives a radar signal detection from a radar detector over a ZIGBEE communication standard.

In box 904, the vehicle camera video recording is flagged for a set time overlapping the electromagnetic signal detection. For example, the vehicle camera embeds a flag in a video recording which lasts three (3) minutes beginning 30 seconds prior to the signal detection. In some embodiments, the set amount of time may be established in a default setting for the vehicle camera system. Embodiments may facilitate user customization to set the amount of time for the recording information to be flagged. In some embodiments, the vehicle camera storage system prioritizes the flagged video recording over other recordings that are not flagged and/or locked whereby the recordings that are not flagged or locked will be overwritten prior to the flagged recording.

In box 906, the vehicle camera may transmit the video recording via the first communication standard to a mobile communication device. For example, the vehicle camera sends the video recording to a user's mobile phone over the ZIGBEE communication standard.

In box 908, the vehicle camera may remove the flag from the copy of the video recording stored in the vehicle camera. For example, the vehicle camera may change the status of the video recording to remove the flag status after the video is transferred to the mobile communication device. Once the flag is removed, the video recording may not receive priority in the vehicle camera's storage system and will be overwritten based upon other default patterns, such as age of the recording, in order with other recordings that are not flagged or locked.

In box 910, the vehicle system transmits the vehicle camera's video recording and the electromagnetic signal detection information via a second communication standard to a server. For example, after receiving the video recording and the electromagnetic signal detection, the mobile communication device may transmit the video recording and signal detection information to a remote server via a wide-area communication network. For another example, the mobile communication device may transmit the video recording to a remote server via a satellite communication network and the vehicle may transmit the electromagnetic signal detection using an integrated cellular communication element to the same remote server.

In box 912, the vehicle camera's video recording is analyzed to determine a likely source of the detected electromagnetic signal using video recognition. For example, the server may conduct an optical recognition analysis of the video recording to identify potential sources of the detected electromagnetic signal and based upon a comparison of the detected signal data to the potential sources of the detected signal determine the likely source of the signal. In some embodiments, the server may include a database of known signal sources, including mobile signal sources and fixed signal sources. The database may also include a database of known false signals and/or signal sources associated with false alert features, such as automatic doors at business establishments, and other known geographic features indicative of false alerts. During optical recognition analysis, the server may identify business establishments known to use false alert sources and evaluate whether the detected signal may correlate to the known signals associated with the business establishment. As another example, the optical recognition analysis may identify a fixed speed monitoring unit or a police vehicle that may be associated with the detected signal.

In box 914, the system may modify a prediction of an alert level based upon the likely source of the electromagnetic signal. For example, the server may lower the prediction of an alert level based on a determination that the detected signal was received near a known false alert signal source, such as a business establishment, and the signal is consistent with the likely false alert source. For another example, the prediction of an alert may increase where the server identifies a police radar unit at the location of the detected signal and the detected signal is consistent with the type of signal generated by the police radar unit. The modified predication may be used to provide alerts to the original vehicle camera system user and user of other devices associated with the alert prediction feature of the server.

The processes 800 and 900 illustrate operations of the vehicle camera system. Additional operations may be facilitated using the vehicle camera system components to exchange information. For example, embodiments of the vehicle camera system may operate to provide vehicle oversight systems for businesses, parents and others. For example, a parent may set the vehicle camera system to save video feeds when the vehicle deviates from selected navigation paths and/or travel times, and the parent may then review the video feed to see where the vehicle traveled. Similarly, a company may monitor company vehicle travel to ensure the company vehicle is not misused. For example, the supervisor may review the video of an unscheduled stop for a company car to determine if the driver stopped for an unapproved personal stop or to get lunch.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the system and method described.

The invention claimed is:

1. A system for use in a vehicle including a vehicle camera that interfaces with a mobile communication device that is separate from the vehicle camera, which displays a prediction to a user, the system comprising:
   the vehicle camera comprising:
   a) a camera display that provides a visual output,
   b) an imaging component, which captures at least one image and creates an image file, c) a memory component designed to electronically store the image file, and
d) a camera communication element configured to communicate over a short-range communication standard; and the mobile communication device comprising:
a) a user interface that receives input from the user and communicates information to the user,
b) a short-range communication element configured to communicate over the short-range communication standard, wherein the short-range communication element communicates with the camera communication element over the short-range communication standard, and
c) a wide-area communication element configured to communicate over a wide-area communication standard; and wherein the mobile communication device exchanges data with the vehicle camera, wherein a geographic location of the vehicle camera is compiled with the image file to create a location identified image file, and wherein the location identified image file includes a timestamp, wherein the data comprises the prediction, which is of an alert level associated with the geographic location of the vehicle camera, and wherein the camera display communicates the prediction to the user, wherein the mobile communication device receives the prediction from a remote server over the wide-area communication standard and communicates the prediction to the vehicle camera over the short-range communication standard, and wherein the prediction is generated based on an analysis of a plurality of data entries associated with the geographic location of the vehicle camera, wherein the location identified image file is analyzed with optical recognition to identify at least one of a potential threat and/or a potential false alert source, wherein the analysis is initiated automatically or by the input received by the user interface, and wherein the vehicle camera interfaces with an electromagnetic signal detector comprising a signal detection component that detects at least one of a radar signal and/or a laser signal emitted by speed measurement equipment.

2. The system of claim 1, wherein the remote server analyzes the plurality of data entries associated with the geographic location of the vehicle camera.

3. The system of claim 1, wherein the remote server applies the optical recognition to a plurality of recorded images from a plurality of imaging sources.

4. The system of claim 1, wherein the mobile communication device comprises a location determination component configured to determine the geographic location.

5. The system of claim 1, wherein the vehicle camera is integrated with the electromagnetic signal.

6. A system for use in a vehicle including a vehicle camera that interfaces with a mobile communication device that is separate from the vehicle camera, which displays a prediction of an alert level associated with a geographic location to a user, the system comprising:

the vehicle camera comprising:
a) a camera display that provides a visual output, wherein the camera display communicates to the user the prediction,
b) an imaging component, which captures at least one image and creates an image file,
c) a memory component designed to electronically store the image file,
d) a short-range camera communication element configured to communicate over a short-range communication standard, and
e) a wide-area camera communication element configured to communicate over a wide-area communication standard; and the mobile communication device comprising:
a) a user interface that receives input from the user and communicates information to the user,
b) a short-range communication element configured to communicate over the short-range communication standard, wherein the short-range communication element communicates with the short-range camera communication element over the short-range communication standard, and
c) a location determination component configured to determine the geographic location; and wherein the mobile communication device exchanges data with the vehicle camera, wherein the data comprises the geographic location, wherein the geographic location is compiled with the image file to create a location identified image file, and wherein the location identified image file includes a timestamp, wherein the vehicle camera receives the prediction from a remote server over the wide-area communication standard, and wherein the prediction is generated based on an analysis of a plurality of data entries associated with the geographic location, and wherein the location identified image file is analyzed with optical recognition to identify at least one of a potential threat and/or a potential false alert source, wherein the analysis is initiated automatically or by the input received by the user interface, and wherein the vehicle camera interfaces with an electromagnetic signal detector comprising a signal detection component that detects at least one of a radar signal and/or a laser signal emitted by speed measurement equipment.

7. The system of claim 6, further comprising the vehicle having a vehicle communication element configured to communicate over the short-range communication standard and a vehicle information system comprising vehicle operation data.

8. The system of claim 6, wherein the plurality of data entries comprises the location identified image file, and wherein the remote server applies the optical recognition.

9. The system of claim 8, wherein the remote server applies the optical recognition to a plurality of the location identified image files which are from a plurality of imaging sources.

10. The system of claim 9, wherein the remote server synchronizes the plurality of the location identified image files based on the geographic location and the timestamp included in each of the location identified image files.

11. The system of claim 10, wherein the remote server transmits the prediction automatically based on the geographic location.

12. The system of claim 6, wherein the vehicle camera is integrated with the electromagnetic signal detector.

13. A vehicle camera that interfaces with an external device that is separate from the vehicle camera, which communicates a prediction to a user, the vehicle camera comprising:

a) a user interface that receives input from the user and communicates information to the user,
b) an imaging component, which captures video,
c) a memory component designed to electronically store the video, and
d) a communication element configured to communicate over a communication standard, wherein the communication element communicates with the external device over the communication standard; and wherein the vehicle camera is designed without a location determination capability and the vehicle camera receives a geographic location and a timestamp from the external device over the communication standard and compiles the geographic location and the timestamp with the video to generate a video file, and wherein the vehicle camera receives the prediction, which is of an alert level associated with the geographic location from a remote server and the user interface communicates the prediction to the user, wherein the vehicle camera receives the prediction indirectly through the external device, which receives the prediction over a wide-area communication standard and communicates the prediction to the vehicle camera over the communication standard, wherein the remote server analyzes a data entry associated with the geographic location to generate the prediction, and wherein the video file is analyzed with optical recognition to identify at least one of a potential threat and/or a potential false alert source, wherein the analysis is initiated automatically or by the input received by the user interface, and wherein the vehicle camera interfaces with an electromagnetic signal detector comprising a signal detection component that detects at least one of a radar signal and/or a laser signal emitted by speed measurement equipment.

14. The vehicle camera of claim 13, wherein the data entry comprises the video file and the remote server applies the optical recognition to the video file.

15. The vehicle camera of claim 13, wherein the external device is a mobile communication device.

16. The vehicle camera of claim 13, wherein the remote server provides instructions to the vehicle camera, wherein the instructions control operations of the vehicle camera.

17. The vehicle camera of claim 16, wherein the remote server provides the instructions based on the geographic location.

18. The vehicle camera of claim 16, wherein the remote server provides the instructions based on the prediction.

19. The vehicle camera of claim 13, wherein the vehicle camera is integrated with the electromagnetic signal detector.

20. A vehicle camera that interfaces with a mobile communication device that is separate from the vehicle camera, the vehicle camera comprising:
a) a user interface that receives inputs from a user and communicates information to the user,
b) an imaging component, which captures video,
c) a memory component designed to electronically store the video, and
d) a communication element configured to communicate over a communication standard, wherein the communication element communicates with the mobile communication device over the communication standard; and wherein the vehicle camera receives a geographic location and a timestamp from the mobile communication device over the communication standard and compiles the geographic location and the timestamp with the video to generate a video file;

wherein the video file is analyzed with optical recognition to identify a potential threat, and a critical trigger is initiated when the potential threat is identified;

wherein the vehicle camera further comprises an automatic upload mode, wherein the video file is automatically transmitted to a remote server upon receipt of the critical trigger by the vehicle camera while in the automatic upload mode; and wherein the vehicle camera interfaces with an electromagnetic signal detector comprising a signal detection component that detects at least one of a radar signal and/or a laser signal emitted by speed measurement equipment.

21. The vehicle camera of claim 20, wherein the critical trigger comprises at least one of a G-Force threshold, a vehicle diagnostic trigger, a safety trigger, a person entering the camera view and/or a theft event trigger.

22. The vehicle camera of claim 21, wherein the safety trigger comprises at least one of an impact trigger, an airbag deployment trigger, a lane departure and/or a distance to object trigger.

23. The vehicle camera of claim 20, wherein the remote server stores the video file in a database upon receipt by the remote server.

24. The vehicle camera of claim 20, wherein the remote server analyzes the video file upon receipt by the remote server.

25. The vehicle camera of claim 24, wherein the remote server determines whether an emergency response is needed based on the analysis.

26. The vehicle camera of claim 25, wherein the remote server initiates a call for the emergency response based on the determination.

27. The vehicle camera of claim 20, wherein the vehicle camera is integrated with the electromagnetic signal detector.

28. The vehicle camera of claim 20, wherein the critical trigger comprises a detection of the at least one of the radar signal and/or the laser signal emitted by the speed measurement equipment.

29. The vehicle camera of claim 20, further comprising a vehicle having a vehicle communication element configured to communicate over the communication standard and a vehicle information system comprising vehicle operation data, and wherein the vehicle camera receives the vehicle operation data over the communication standard, and the vehicle camera incorporates the vehicle operation data into the video file.

30. The vehicle camera of claim 29, wherein the vehicle operation data comprises at least one of a vehicle diagnostic reading, a vehicle speed, a vehicle acceleration, a brake reading and/or a safety trigger indication.

31. A system for use in a vehicle including a vehicle camera that interfaces with an external device that is separate from the vehicle camera, wherein the external device communicates a prediction to a user, the system comprising:
the vehicle camera comprising:
a) an imaging component, which captures at least one image and creates an image file,
b) a memory component designed to electronically store the image file, and c) a camera communication element configured to communicate over a short-range communication standard; and the external device comprising:

d) a user interface that receives input from the user and communicates information to the user, and e) an external device communication element configured to communicate over the short-range communication standard, wherein the external device communication element communicates with the camera communication element over the short-range communication standard; and wherein the external device exchanges data with the vehicle camera, wherein a geographic location of the vehicle camera is compiled with the image file to create a location identified image file, and wherein the location identified image file includes a timestamp, wherein the system receives the prediction, which is of an alert level associated with the geographic location of the vehicle camera, and wherein the user interface communicates the prediction to the user, wherein the prediction is generated based on an analysis of a plurality of data entries associated with the geographic location of the vehicle camera, and wherein the location identified image file is analyzed with optical recognition to identify at least one of a potential threat and/or a potential false alert source, wherein the analysis is initiated automatically or by the input received by the user interface, and wherein the vehicle camera interfaces with an electromagnetic signal detector comprising a signal detection component that detects at least one of a radar signal and/or a laser signal emitted by speed measurement equipment.

32. The vehicle camera of claim 31, wherein the external device receives the prediction from a remote server over a wide-area communication standard.

33. The vehicle camera of claim 31, wherein the vehicle camera receives the prediction from a remote server over a wide-area communication standard and communicates the prediction to the external device over the short-range communication standard.

* * * * *

UNITED STATES PATENT AND TRADEMARK OFFICE
CERTIFICATE OF CORRECTION

PATENT NO. : 10,298,832 B2
APPLICATION NO. : 16/198232
DATED : May 21, 2019
INVENTOR(S) : Wilfred Charles Boudreau et al.

It is certified that error appears in the above-identified patent and that said Letters Patent is hereby corrected as shown below:

On the Title Page

Item (57), In the Abstract Line 3: Delete "operating" and insert --operates--

In the Specification

Column 4, Lines 51-52: insert --the-- between "adjust" and "focal"

Column 5, Line 1: insert --the-- between "that" and "recorded"

Column 8, Line 31: insert --network-- after "Wi-Fi"

Column 11, Line 5: delete "or and/modify" and insert --and/or modify--

Column 12, Line 48: insert --network-- after "Wi-Fi"

Column 19, Line 10: delete "402" and insert --404--

Column 20, Line 55: delete "412" and insert --414--

Column 21, Line 48: delete "vehicles" and insert --vehicle's--

Column 24, Line 9: delete "anticipate" and insert --anticipated--

Column 24, Line 11: insert --to-- between "continues" and "travel"

Column 28, Line 66: delete "pair" and insert --paired--

Column 32, Line 34: insert --to-- between "jump" and "the"

Signed and Sealed this
Thirteenth Day of August, 2019

Andrei Iancu
*Director of the United States Patent and Trademark Office*

CERTIFICATE OF CORRECTION (continued)
U.S. Pat. No. 10,298,832 B2

Column 33, Line 30: insert --to-- between "indicator" and "show"

Column 36, Line 33: delete "predication" and insert --prediction--

In the Claims

Column 37, Line 56, Claim 5: insert --detector-- after "signal"